US009973489B2

(12) United States Patent
Barton et al.

(10) Patent No.: US 9,973,489 B2
(45) Date of Patent: *May 15, 2018

(54) PROVIDING VIRTUALIZED PRIVATE NETWORK TUNNELS

(71) Applicant: Citrix Systems, Inc., Fort Lauderdale, FL (US)

(72) Inventors: Gary Barton, Boca Raton, FL (US); Zhongmin Lang, Parkland, FL (US); Nitin Desai, Coral Springs, FL (US); James Robert Walker, Deerfield Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/347,247

(22) Filed: Nov. 9, 2016

(65) Prior Publication Data
US 2017/0063839 A1    Mar. 2, 2017

Related U.S. Application Data

(63) Continuation of application No. 14/535,597, filed on Nov. 7, 2014, now Pat. No. 9,521,117, which is a
(Continued)

(51) Int. Cl.
*H04L 29/06* (2006.01)
*H04W 12/06* (2009.01)
*H04W 12/08* (2009.01)

(52) U.S. Cl.
CPC ........ *H04L 63/0807* (2013.01); *H04L 63/029* (2013.01); *H04L 63/0272* (2013.01);
(Continued)

(58) Field of Classification Search
CPC ............ H04L 63/0807; H04L 63/0272; H04L 63/029; H04L 63/20; H04W 12/06; H04W 12/08
See application file for complete search history.

(56) References Cited

U.S. PATENT DOCUMENTS 5,369,702 A    11/1994  Shanton
5,805,803 A     9/1998  Birrell et al.
(Continued)

FOREIGN PATENT DOCUMENTS

CN    1313690 A    9/2001
CN    1613040 A    5/2005
(Continued)

OTHER PUBLICATIONS

Dec. 13, 2005—Lowe, "Application-Specific VPNs".
(Continued)

*Primary Examiner* — Oleg Korsak
(74) *Attorney, Agent, or Firm* — Banner & Witcoff, Ltd.

(57) ABSTRACT

Various aspects of the disclosure relate to providing a per-application policy-controlled virtual private network (VPN) tunnel. In some embodiments, tickets may be used to provide access to an enterprise resource without separate authentication of the application and, in some instances, can be used in such a manner as to provide a seamless experience to the user when reestablishing a per-application policy controlled VPN tunnel during the lifetime of the ticket. Additional aspects relate to an access gateway providing updated policy information and tickets to a mobile device. Other aspects relate to selectively wiping the tickets from a secure container of the mobile device. Yet further aspects relate to operating applications in multiple modes, such as a
(Continued)

managed mode and an unmanaged mode, and providing authentication-related services based on one or more of the above aspects.

20 Claims, 15 Drawing Sheets

Related U.S. Application Data continuation of application No. 14/029,068, filed on Sep. 17, 2013, now Pat. No. 8,914,845, which is a continuation of application No. 14/027,929, filed on Sep. 16, 2013, now abandoned.

(60) Provisional application No. 61/861,909, filed on Aug. 2, 2013, provisional application No. 61/806,577, filed on Mar. 29, 2013, provisional application No. 61/713,763, filed on Oct. 15, 2012.

(52) U.S. Cl.
CPC ............ *H04L 63/20* (2013.01); *H04W 12/06* (2013.01); *H04W 12/08* (2013.01); *H04L 63/0815* (2013.01)

(56) References Cited

U.S. PATENT DOCUMENTS

| | | |
|---|---|---|
| 6,151,606 A | 11/2000 | Mendez |
| 6,154,172 A | 11/2000 | Piccionelli et al. |
| 6,314,409 B2 | 11/2001 | Schneck et al. |
| 6,480,096 B1 | 11/2002 | Gutman et al. |
| 6,609,198 B1 | 8/2003 | Wood et al. |
| 6,621,766 B2 | 9/2003 | Brewer et al. |
| 6,751,738 B2 | 6/2004 | Wesinger, Jr. et al. |
| 6,859,879 B2 | 2/2005 | Henn et al. |
| 6,883,098 B1 | 4/2005 | Roman et al. |
| 6,987,906 B2 | 1/2006 | Nakama et al. |
| 7,043,453 B2 | 5/2006 | Stefik et al. |
| 7,065,652 B1 | 6/2006 | Xu et al. |
| 7,103,915 B2 | 9/2006 | Redlich et al. |
| 7,110,629 B2 | 9/2006 | Bjorkman et al. |
| 7,159,120 B2 | 1/2007 | Muratov et al. |
| 7,240,015 B1 | 7/2007 | Karmouch et al. |
| 7,254,831 B2 | 8/2007 | Saunders et al. |
| 7,263,256 B2 | 8/2007 | Kim et al. |
| 7,269,605 B1 | 9/2007 | Nguyen et al. |
| 7,340,772 B2 | 3/2008 | Panasyuk et al. |
| 7,349,913 B2 | 3/2008 | Clark et al. |
| 7,350,085 B2 | 3/2008 | Johnson et al. |
| 7,415,498 B2 | 8/2008 | Russo et al. |
| 7,437,752 B2 | 10/2008 | Heard et al. |
| 7,437,755 B2 | 10/2008 | Farino et al. |
| 7,454,102 B2 | 11/2008 | Keyser et al. |
| 7,490,073 B1 | 2/2009 | Qureshi et al. |
| 7,490,352 B2 | 2/2009 | Kramer et al. |
| 7,496,954 B1 | 2/2009 | Himawan et al. |
| 7,502,861 B1 | 3/2009 | Protassov et al. |
| 7,509,672 B1 | 3/2009 | Horwitz et al. |
| 7,515,717 B2 | 4/2009 | Doyle et al. |
| 7,526,170 B2 | 4/2009 | Kishima |
| 7,526,800 B2 | 4/2009 | Wright et al. |
| 7,529,923 B2 | 5/2009 | Chartrand et al. |
| 7,574,090 B2 | 8/2009 | Shimooka |
| 7,596,593 B2 | 9/2009 | Mitchell et al. |
| 7,599,991 B2 | 10/2009 | Vargas et al. |
| 7,631,297 B2 | 12/2009 | Childress et al. |
| 7,644,377 B1 | 1/2010 | Saxe et al. |
| 7,665,125 B2 | 2/2010 | Heard et al. |
| 7,697,737 B2 | 4/2010 | Aull et al. |
| 7,716,240 B2 | 5/2010 | Lim |
| 7,743,260 B2 | 6/2010 | Fetik |
| 7,761,523 B2 | 7/2010 | May et al. |
| 7,774,323 B2 | 8/2010 | Helfman |
| 7,779,408 B1 | 8/2010 | Papineau |
| 7,779,458 B1 | 8/2010 | Heiderscheit et al. |
| 7,788,535 B2 | 8/2010 | Bussa et al. |
| 7,788,536 B1 | 8/2010 | Qureshi et al. |
| 7,793,333 B2 | 9/2010 | Goh et al. |
| 7,865,888 B1 | 1/2011 | Qureshi et al. |
| 7,890,612 B2 | 2/2011 | Todd et al. |
| 7,904,468 B2 | 3/2011 | Neil et al. |
| 7,921,182 B2 | 4/2011 | Hamasaki, Jr. et al. |
| 7,921,303 B2 | 4/2011 | Mauro, II |
| 7,945,788 B2 | 5/2011 | Roberts et al. |
| 7,950,066 B1 | 5/2011 | Zuili |
| 7,966,323 B2 | 6/2011 | Bocking et al. |
| 7,966,652 B2 | 6/2011 | Ganesan |
| 7,970,386 B2 | 6/2011 | Bhat et al. |
| 7,970,923 B2 | 6/2011 | Pedersen et al. |
| 8,001,278 B2 | 8/2011 | Huggahalli et al. |
| 8,012,219 B2 | 9/2011 | Mendez et al. |
| 8,037,421 B2 | 10/2011 | Scott et al. |
| 8,051,180 B2 | 11/2011 | Mazzaferri et al. |
| 8,060,074 B2 | 11/2011 | Danford et al. |
| 8,060,596 B1 | 11/2011 | Wootton et al. |
| 8,078,713 B1 | 12/2011 | Kim |
| 8,085,891 B2 | 12/2011 | Owen |
| 8,095,517 B2 | 1/2012 | Sandoval et al. |
| 8,095,786 B1 | 1/2012 | Kshirsagar et al. |
| 8,103,765 B2 | 1/2012 | Greifeneder et al. |
| 8,108,456 B2 | 1/2012 | Chen et al. |
| 8,117,589 B2 | 2/2012 | Christensen et al. |
| 8,126,128 B1 | 2/2012 | Hicks, III et al. |
| 8,126,506 B2 | 2/2012 | Roundtree |
| 8,132,242 B1 | 3/2012 | Wu |
| 8,181,010 B1 | 5/2012 | Uchil et al. |
| 8,200,626 B1 | 6/2012 | Katzer et al. |
| 8,214,887 B2 | 7/2012 | Clark et al. |
| 8,238,256 B2 | 8/2012 | Nugent |
| 8,239,918 B1 | 8/2012 | Cohen |
| 8,245,285 B1 | 8/2012 | Ravishankar et al. |
| 8,261,231 B1 | 9/2012 | Hirsch et al. |
| 8,272,030 B1 | 9/2012 | Annan et al. |
| 8,285,681 B2 | 10/2012 | Prahlad et al. |
| 8,296,239 B2 | 10/2012 | Nonaka |
| 8,296,821 B2 | 10/2012 | Nakae |
| 8,321,953 B2 | 11/2012 | Jevans |
| 8,332,464 B2 | 12/2012 | Dispensa et al. |
| 8,359,016 B2 | 1/2013 | Lindeman et al. |
| 8,365,258 B2 | 1/2013 | Dispensa |
| 8,365,266 B2 | 1/2013 | Bogner |
| 8,387,110 B1 | 2/2013 | Cooper |
| 8,402,011 B1 | 3/2013 | Bodenhamer |
| 8,406,748 B2 | 3/2013 | Raleigh et al. |
| 8,418,238 B2 | 4/2013 | Platt et al. |
| 8,443,456 B2 | 5/2013 | van der Linden |
| 8,463,253 B2 | 6/2013 | Chipalkatti et al. |
| 8,463,946 B2 | 6/2013 | Ferguson et al. |
| 8,468,090 B2 | 6/2013 | Lesandro et al. |
| 8,468,455 B2 | 6/2013 | Jorgensen et al. |
| 8,495,746 B2 | 7/2013 | Fissel et al. |
| 8,528,059 B1 | 9/2013 | Labana et al. |
| 8,549,656 B2 | 10/2013 | Blaisdell et al. |
| 8,560,709 B1 | 10/2013 | Shokhor et al. |
| 8,578,443 B2 | 11/2013 | Narain et al. |
| 8,584,114 B2 | 11/2013 | Rabinovich et al. |
| 8,601,562 B2 | 12/2013 | Milas |
| 8,612,947 B2 | 12/2013 | LeRoux et al. |
| 8,613,070 B1 | 12/2013 | Borzycki et al. |
| 8,621,620 B2 | 12/2013 | Sallam |
| 8,650,303 B1 | 2/2014 | Lang et al. |
| 8,650,620 B2 | 2/2014 | Chawla et al. |
| 8,660,530 B2 | 2/2014 | Sharp et al. |
| 8,687,814 B2 | 4/2014 | Nord et al. |
| 8,688,583 B2 | 4/2014 | Boccon-Gibod et al. |
| 8,719,898 B1 | 5/2014 | Barton et al. |
| 8,799,994 B2 | 8/2014 | Barton et al. |
| 8,806,570 B2 | 8/2014 | Barton et al. |
| 8,825,863 B2 | 9/2014 | Hansson et al. |
| 8,843,734 B2 | 9/2014 | Lim |
| 8,850,010 B1 | 9/2014 | Qureshi |
| 8,850,049 B1 | 9/2014 | Qureshi |

(56) References Cited

U.S. PATENT DOCUMENTS

| | | |
|---|---|---|
| 8,850,423 B2 | 9/2014 | Barkie et al. |
| 8,850,434 B1 | 9/2014 | Butikofer et al. |
| 8,856,909 B1 | 10/2014 | Chickering |
| 8,863,297 B2 | 10/2014 | Sharma et al. |
| 8,863,298 B2 | 10/2014 | Akella et al. |
| 8,863,299 B2 | 10/2014 | Sharma et al. |
| 8,881,228 B2 | 11/2014 | Qureshi |
| 8,881,229 B2 | 11/2014 | Barton et al. |
| 8,918,834 B1 | 12/2014 | Samuelsson |
| 8,931,038 B2 | 1/2015 | Pulier et al. |
| 8,949,929 B2 | 2/2015 | Kelly et al. |
| 8,972,980 B2 | 3/2015 | Banga et al. |
| 9,043,242 B2 | 5/2015 | Kuriya et al. |
| 9,183,380 B2 | 11/2015 | Qureshi et al. |
| 9,213,850 B2 | 12/2015 | Barton et al. |
| 9,280,377 B2 | 3/2016 | Lang et al. |
| 9,311,509 B2 | 4/2016 | Casper et al. |
| 9,355,253 B2 | 5/2016 | Kellerman et al. |
| 9,356,895 B2 | 5/2016 | Chiu |
| 9,521,147 B2 | 12/2016 | Barton et al. |
| 9,716,689 B2 | 7/2017 | Andress et al. |
| 2001/0027383 A1 | 10/2001 | Maliszewski |
| 2001/0042045 A1 | 11/2001 | Howard et al. |
| 2002/0112047 A1 | 8/2002 | Kushwaha et al. |
| 2002/0120607 A1 | 8/2002 | Price et al. |
| 2002/0180790 A1 | 12/2002 | Broussard |
| 2003/0031319 A1 | 2/2003 | Abe et al. |
| 2003/0037103 A1 | 2/2003 | Salmi et al. |
| 2003/0046366 A1 | 3/2003 | Pardikar et al. |
| 2003/0065947 A1 | 4/2003 | Song et al. |
| 2003/0083954 A1 | 5/2003 | Namba |
| 2003/0103075 A1 | 6/2003 | Rosselot |
| 2003/0131245 A1 | 7/2003 | Linderman |
| 2003/0157947 A1 | 8/2003 | Fiatal et al. |
| 2003/0188193 A1 | 10/2003 | Venkataramappa |
| 2003/0229623 A1 | 12/2003 | Chang et al. |
| 2003/0229786 A1 | 12/2003 | Hollis et al. |
| 2003/0236861 A1 | 12/2003 | Johnson et al. |
| 2004/0006706 A1 | 1/2004 | Erlingsson |
| 2004/0010579 A1 | 1/2004 | Freese |
| 2004/0012041 A1 | 1/2004 | West et al. |
| 2004/0083273 A1 | 4/2004 | Madison et al. |
| 2004/0096152 A1 | 5/2004 | Nakama et al. |
| 2004/0107342 A1 | 6/2004 | Pham et al. |
| 2004/0111640 A1 | 6/2004 | Baum |
| 2004/0114853 A1 | 6/2004 | Bjorkman et al. |
| 2004/0117651 A1 | 6/2004 | Little et al. |
| 2004/0123153 A1 | 6/2004 | Wright et al. |
| 2004/0205233 A1 | 10/2004 | Dunk |
| 2004/0230807 A1 | 11/2004 | Baird et al. |
| 2004/0243349 A1 | 12/2004 | Greifeneder et al. |
| 2005/0027843 A1 | 2/2005 | Bozak et al. |
| 2005/0027862 A1 | 2/2005 | Nguyen et al. |
| 2005/0055578 A1 | 3/2005 | Wright et al. |
| 2005/0063637 A1 | 3/2005 | Mershon et al. |
| 2005/0076082 A1 | 4/2005 | Le Pennec et al. |
| 2005/0076085 A1 | 4/2005 | Budd et al. |
| 2005/0086328 A1 | 4/2005 | Landram et al. |
| 2005/0097608 A1 | 5/2005 | Penke et al. |
| 2005/0111354 A1 | 5/2005 | Asano et al. |
| 2005/0149340 A1 | 7/2005 | Murakami et al. |
| 2005/0166264 A1 | 7/2005 | Yamada et al. |
| 2005/0172241 A1 | 8/2005 | Daniels et al. |
| 2005/0193222 A1 | 9/2005 | Greene |
| 2005/0210252 A1 | 9/2005 | Freeman et al. |
| 2005/0255838 A1 | 11/2005 | Adams et al. |
| 2005/0262429 A1 | 11/2005 | Elder et al. |
| 2005/0265548 A1 | 12/2005 | Tsuchimura |
| 2005/0273592 A1 | 12/2005 | Pryor et al. |
| 2006/0005250 A1 | 1/2006 | Chu et al. |
| 2006/0048142 A1 | 3/2006 | Roese et al. |
| 2006/0070114 A1 | 3/2006 | Wood et al. |
| 2006/0075036 A1 | 4/2006 | Malik |
| 2006/0075123 A1 | 4/2006 | Burr et al. |
| 2006/0080432 A1 | 4/2006 | Spataro et al. |
| 2006/0085826 A1 | 4/2006 | Funk et al. |
| 2006/0094400 A1 | 5/2006 | Beachem et al. |
| 2006/0105479 A1 | 5/2006 | Cave et al. |
| 2006/0112428 A1 | 5/2006 | Etelapera |
| 2006/0117104 A1 | 6/2006 | Taniguchi et al. |
| 2006/0120526 A1 | 6/2006 | Boucher et al. |
| 2006/0141985 A1 | 6/2006 | Patel et al. |
| 2006/0147043 A1 | 7/2006 | Mann et al. |
| 2006/0161635 A1 | 7/2006 | Lamkin et al. |
| 2006/0161783 A1 | 7/2006 | Aiken et al. |
| 2006/0185004 A1 | 8/2006 | Song et al. |
| 2006/0200814 A1 | 9/2006 | Kontinen et al. |
| 2006/0224742 A1 | 10/2006 | Shahbazi |
| 2006/0225033 A1 | 10/2006 | Ye et al. |
| 2006/0225142 A1 | 10/2006 | Moon |
| 2006/0242685 A1 | 10/2006 | Heard et al. |
| 2006/0248577 A1 | 11/2006 | Beghian et al. |
| 2006/0253508 A1 | 11/2006 | Colton et al. |
| 2006/0256739 A1 | 11/2006 | Seier et al. |
| 2006/0259755 A1 | 11/2006 | Kenoyer |
| 2006/0282889 A1 | 12/2006 | Brown et al. |
| 2007/0005713 A1 | 1/2007 | LeVasseur et al. |
| 2007/0006327 A1 | 1/2007 | Lal et al. |
| 2007/0011749 A1 | 1/2007 | Allison et al. |
| 2007/0016771 A1 | 1/2007 | Allison et al. |
| 2007/0016907 A1 | 1/2007 | Benedetti et al. |
| 2007/0024646 A1 | 2/2007 | Saarinen et al. |
| 2007/0038764 A1 | 2/2007 | Maillard |
| 2007/0049297 A1 | 3/2007 | Gopalan et al. |
| 2007/0054627 A1 | 3/2007 | Wormald |
| 2007/0056043 A1 | 3/2007 | Onyon et al. |
| 2007/0072598 A1 | 3/2007 | Coleman et al. |
| 2007/0074033 A1 | 3/2007 | Adams et al. |
| 2007/0079249 A1 | 4/2007 | Pall et al. |
| 2007/0088825 A1 | 4/2007 | Hodul |
| 2007/0094220 A1 | 4/2007 | McCaffrey |
| 2007/0100938 A1 | 5/2007 | Bagley et al. |
| 2007/0109983 A1 | 5/2007 | Shankar et al. |
| 2007/0118558 A1 | 5/2007 | Kahandaliyanage |
| 2007/0136471 A1 | 6/2007 | Jardin |
| 2007/0143515 A1 | 6/2007 | Kershaw et al. |
| 2007/0156897 A1 | 7/2007 | Lim |
| 2007/0180447 A1 | 8/2007 | Mazzaferri et al. |
| 2007/0180509 A1 | 8/2007 | Swartz et al. |
| 2007/0186106 A1 | 8/2007 | Ting et al. |
| 2007/0198656 A1 | 8/2007 | Mazzaferri et al. |
| 2007/0199051 A1 | 8/2007 | Parikh et al. |
| 2007/0204153 A1 | 8/2007 | Tome et al. |
| 2007/0204166 A1 | 8/2007 | Tome et al. |
| 2007/0208936 A1 | 9/2007 | Ramos Robles |
| 2007/0214272 A1 | 9/2007 | Isaacson |
| 2007/0226034 A1 | 9/2007 | Khan |
| 2007/0226225 A1 | 9/2007 | Yiu et al. |
| 2007/0226227 A1 | 9/2007 | Helfman |
| 2007/0226773 A1 | 9/2007 | Pouliot |
| 2007/0244987 A1 | 10/2007 | Pedersen et al. |
| 2007/0245409 A1 | 10/2007 | Harris et al. |
| 2007/0248085 A1 | 10/2007 | Volpano |
| 2007/0253663 A1 | 11/2007 | Keyser et al. |
| 2007/0262327 A1 | 11/2007 | Shimooka |
| 2007/0266421 A1 | 11/2007 | Vaidya et al. |
| 2007/0266422 A1 | 11/2007 | Germano et al. |
| 2007/0283324 A1 | 12/2007 | Geisinger |
| 2008/0027871 A1 | 1/2008 | Seo |
| 2008/0027982 A1 | 1/2008 | Subramanian et al. |
| 2008/0046580 A1 | 2/2008 | Lafuente et al. |
| 2008/0047006 A1 | 2/2008 | Jeong et al. |
| 2008/0047015 A1 | 2/2008 | Cornwall et al. |
| 2008/0052395 A1 | 2/2008 | Wright et al. |
| 2008/0066020 A1 | 3/2008 | Boss et al. |
| 2008/0066177 A1 | 3/2008 | Bender |
| 2008/0070495 A1 | 3/2008 | Stricklen et al. |
| 2008/0085075 A1 | 4/2008 | Kishima |
| 2008/0092215 A1 | 4/2008 | Soukup et al. |
| 2008/0127292 A1 | 5/2008 | Cooper et al. |
| 2008/0133729 A1 | 6/2008 | Fridman et al. |
| 2008/0134292 A1 | 6/2008 | Ariel et al. |
| 2008/0141335 A1 | 6/2008 | Thomas |
| 2008/0163188 A1 | 7/2008 | Siskind et al. |

(56) References Cited

U.S. PATENT DOCUMENTS

| | | |
|---|---|---|
| 2008/0163286 A1 | 7/2008 | Rudolph et al. |
| 2008/0167002 A1 | 7/2008 | Kim et al. |
| 2008/0178169 A1 | 7/2008 | Grossner et al. |
| 2008/0178300 A1 | 7/2008 | Brown et al. |
| 2008/0183820 A1 | 7/2008 | Golovchinsky et al. |
| 2008/0194296 A1 | 8/2008 | Roundtree |
| 2008/0196038 A1 | 8/2008 | Antonio et al. |
| 2008/0196082 A1 | 8/2008 | Sandoval et al. |
| 2008/0209506 A1 | 8/2008 | Ghai et al. |
| 2008/0209564 A1 | 8/2008 | Gayde et al. |
| 2008/0214300 A1 | 9/2008 | Williams et al. |
| 2008/0229117 A1 | 9/2008 | Shin et al. |
| 2008/0235760 A1 | 9/2008 | Broussard et al. |
| 2008/0263224 A1 | 10/2008 | Gilhuly et al. |
| 2008/0270240 A1 | 10/2008 | Chu |
| 2008/0271111 A1 | 10/2008 | Cox et al. |
| 2008/0304665 A1 | 12/2008 | Ma et al. |
| 2008/0313257 A1 | 12/2008 | Allen et al. |
| 2008/0313648 A1 | 12/2008 | Wang et al. |
| 2008/0317292 A1 | 12/2008 | Baker et al. |
| 2008/0318616 A1 | 12/2008 | Chipalkatti et al. |
| 2009/0006232 A1 | 1/2009 | Gallagher et al. |
| 2009/0028049 A1 | 1/2009 | Boudreau et al. |
| 2009/0030968 A1 | 1/2009 | Boudreau et al. |
| 2009/0037686 A1 | 2/2009 | Mendonca |
| 2009/0037976 A1 | 2/2009 | Teo et al. |
| 2009/0049425 A1 | 2/2009 | Liepert et al. |
| 2009/0051755 A1 | 2/2009 | Toya et al. |
| 2009/0064292 A1 | 3/2009 | Carter et al. |
| 2009/0075630 A1 | 3/2009 | McLean |
| 2009/0077638 A1 | 3/2009 | Norman et al. |
| 2009/0083374 A1 | 3/2009 | Saint Clair |
| 2009/0100060 A1 | 4/2009 | Livnat et al. |
| 2009/0119773 A1 | 5/2009 | D'Amore et al. |
| 2009/0121890 A1 | 5/2009 | Brown et al. |
| 2009/0170532 A1 | 7/2009 | Lee et al. |
| 2009/0172657 A1 | 7/2009 | Makelainen et al. |
| 2009/0172789 A1 | 7/2009 | Band et al. |
| 2009/0178111 A1 | 7/2009 | Moriconi et al. |
| 2009/0187763 A1 | 7/2009 | Freericks et al. |
| 2009/0199178 A1 | 8/2009 | Keller et al. |
| 2009/0199277 A1 | 8/2009 | Norman et al. |
| 2009/0210934 A1 | 8/2009 | Innes |
| 2009/0221278 A1 | 9/2009 | Spelta et al. |
| 2009/0222880 A1 | 9/2009 | Mayer et al. |
| 2009/0228714 A1 | 9/2009 | Fiske et al. |
| 2009/0228954 A1 | 9/2009 | Hu et al. |
| 2009/0228963 A1 | 9/2009 | Pearce et al. |
| 2009/0249359 A1 | 10/2009 | Caunter et al. |
| 2009/0253410 A1 | 10/2009 | Fitzgerald et al. |
| 2009/0253412 A1 | 10/2009 | Sigmund et al. |
| 2009/0263923 A1 | 10/2009 | Shimooka |
| 2009/0265554 A1 | 10/2009 | Robles et al. |
| 2009/0282127 A1 | 11/2009 | LeBlanc et al. |
| 2009/0282473 A1 | 11/2009 | Karlson et al. |
| 2009/0319772 A1 | 12/2009 | Singh et al. |
| 2009/0323916 A1 | 12/2009 | O'Sullivan et al. |
| 2009/0325615 A1 | 12/2009 | McKay et al. |
| 2009/0327885 A1 | 12/2009 | Aoki et al. |
| 2009/0327994 A1 | 12/2009 | Christensen et al. |
| 2010/0049874 A1 | 2/2010 | Chene et al. |
| 2010/0050092 A1 | 2/2010 | Williams et al. |
| 2010/0054463 A1 | 3/2010 | Tsan |
| 2010/0058352 A1 | 3/2010 | Esfahany et al. |
| 2010/0064341 A1 | 3/2010 | Aldera |
| 2010/0064354 A1 | 3/2010 | Irvine |
| 2010/0077445 A1 | 3/2010 | Schneider et al. |
| 2010/0077469 A1 | 3/2010 | Furman et al. |
| 2010/0083358 A1 | 4/2010 | Govindarajan et al. |
| 2010/0100825 A1 | 4/2010 | Sharoni |
| 2010/0100925 A1 | 4/2010 | Hinton |
| 2010/0124196 A1 | 5/2010 | Bonar et al. |
| 2010/0125730 A1 | 5/2010 | Dodgson et al. |
| 2010/0146523 A1 | 6/2010 | Brigaut et al. |
| 2010/0146582 A1 | 6/2010 | Jaber et al. |
| 2010/0150341 A1 | 6/2010 | Dodgson et al. |
| 2010/0154025 A1 | 6/2010 | Esteve Balducci et al. |
| 2010/0162232 A1 | 6/2010 | Bhatia et al. |
| 2010/0173607 A1 | 7/2010 | Thornton et al. |
| 2010/0180346 A1 | 7/2010 | Nicolson et al. |
| 2010/0192212 A1 | 7/2010 | Raleigh |
| 2010/0228825 A1 | 9/2010 | Hegde et al. |
| 2010/0228961 A1 | 9/2010 | Burns et al. |
| 2010/0229197 A1 | 9/2010 | Yi et al. |
| 2010/0235216 A1 | 9/2010 | Hehmeyer et al. |
| 2010/0248699 A1 | 9/2010 | Dumais |
| 2010/0257580 A1 | 10/2010 | Zhao et al. |
| 2010/0269156 A1 | 10/2010 | Hohlfeld et al. |
| 2010/0279652 A1 | 11/2010 | Sharp et al. |
| 2010/0287619 A1 | 11/2010 | Chase |
| 2010/0299152 A1 | 11/2010 | Batchu et al. |
| 2010/0299376 A1 | 11/2010 | Batchu et al. |
| 2010/0317336 A1 | 12/2010 | Ferren et al. |
| 2010/0318992 A1 | 12/2010 | Kushwaha et al. |
| 2010/0319053 A1 | 12/2010 | Gharabally |
| 2010/0325097 A1 | 12/2010 | Er et al. |
| 2010/0331017 A1 | 12/2010 | Ariga |
| 2010/0333165 A1 | 12/2010 | Basak et al. |
| 2011/0030044 A1 | 2/2011 | Kranendonk et al. |
| 2011/0072492 A1 | 3/2011 | Mohler et al. |
| 2011/0082900 A1 | 4/2011 | Nagpal et al. |
| 2011/0145360 A1 | 6/2011 | Sheshagiri et al. |
| 2011/0145833 A1 | 6/2011 | De Los Reyes et al. |
| 2011/0154266 A1 | 6/2011 | Friend et al. |
| 2011/0154305 A1 | 6/2011 | LeRoux et al. |
| 2011/0154477 A1 | 6/2011 | Parla et al. |
| 2011/0154498 A1 | 6/2011 | Fissel et al. |
| 2011/0167492 A1 | 7/2011 | Ghosh et al. |
| 2011/0179484 A1 | 7/2011 | Tuvell et al. |
| 2011/0208797 A1 | 8/2011 | Kim |
| 2011/0208838 A1 | 8/2011 | Thomas et al. |
| 2011/0209064 A1 | 8/2011 | Jorgensen et al. |
| 2011/0209194 A1 | 8/2011 | Kennedy |
| 2011/0219124 A1 | 9/2011 | Allen et al. |
| 2011/0225417 A1 | 9/2011 | Maharajh et al. |
| 2011/0239125 A1 | 9/2011 | Kristensen et al. |
| 2011/0252232 A1 | 10/2011 | De Atley et al. |
| 2011/0252459 A1 | 10/2011 | Walsh et al. |
| 2011/0258301 A1 | 10/2011 | McCormick et al. |
| 2011/0270963 A1 | 11/2011 | Saito et al. |
| 2011/0271279 A1 | 11/2011 | Pate |
| 2011/0276683 A1 | 11/2011 | Goldschlag et al. |
| 2011/0276699 A1 | 11/2011 | Pedersen |
| 2011/0277026 A1 | 11/2011 | Agarwal et al. |
| 2011/0277027 A1 | 11/2011 | Hayton et al. |
| 2011/0283347 A1 | 11/2011 | Bhuta et al. |
| 2011/0295970 A1 | 12/2011 | Miyazawa |
| 2011/0296333 A1 | 12/2011 | Bateman et al. |
| 2011/0314534 A1 | 12/2011 | James |
| 2012/0002813 A1 | 1/2012 | Wei et al. |
| 2012/0005476 A1 | 1/2012 | Wei et al. |
| 2012/0005724 A1 | 1/2012 | Lee |
| 2012/0005745 A1 | 1/2012 | Wei et al. |
| 2012/0005746 A1 | 1/2012 | Wei et al. |
| 2012/0023378 A1 | 1/2012 | Nomura et al. |
| 2012/0023506 A1 | 1/2012 | Maeckel et al. |
| 2012/0023556 A1 | 1/2012 | Schultz et al. |
| 2012/0036347 A1 | 2/2012 | Swanson et al. |
| 2012/0036370 A1 | 2/2012 | Lim et al. |
| 2012/0042036 A1 | 2/2012 | Lau et al. |
| 2012/0052954 A1 | 3/2012 | Zhu et al. |
| 2012/0054853 A1 | 3/2012 | Gupta et al. |
| 2012/0066691 A1 | 3/2012 | Branton |
| 2012/0079475 A1 | 3/2012 | Hicks, III et al. |
| 2012/0079556 A1 | 3/2012 | Wahl |
| 2012/0084184 A1 | 4/2012 | Raleigh et al. |
| 2012/0088540 A1 | 4/2012 | Smith et al. |
| 2012/0096533 A1 | 4/2012 | Boulos et al. |
| 2012/0096544 A1 | 4/2012 | Hosoda |
| 2012/0102195 A1 | 4/2012 | Adams et al. |
| 2012/0109384 A1 | 5/2012 | Stepanian |
| 2012/0110317 A1 | 5/2012 | Scheer et al. |
| 2012/0117622 A1 | 5/2012 | Gronholm et al. |
| 2012/0129503 A1 | 5/2012 | Lindeman et al. |

(56) References Cited

U.S. PATENT DOCUMENTS

| | | |
|---|---|---|
| 2012/0131116 A1 | 5/2012 | Tu et al. |
| 2012/0131343 A1 | 5/2012 | Choi et al. |
| 2012/0131685 A1 | 5/2012 | Broch et al. |
| 2012/0137364 A1 | 5/2012 | Blaisdell |
| 2012/0151033 A1 | 6/2012 | Baliga et al. |
| 2012/0154265 A1 | 6/2012 | Kim et al. |
| 2012/0154413 A1 | 6/2012 | Kim et al. |
| 2012/0157165 A1 | 6/2012 | Kim et al. |
| 2012/0157166 A1 | 6/2012 | Kim et al. |
| 2012/0159139 A1 | 6/2012 | Kim et al. |
| 2012/0159334 A1 | 6/2012 | Messerly et al. |
| 2012/0165075 A1 | 6/2012 | Kim et al. |
| 2012/0166516 A1 | 6/2012 | Simmons et al. |
| 2012/0166524 A1 | 6/2012 | Watakabe et al. |
| 2012/0166997 A1 | 6/2012 | Cho et al. |
| 2012/0167118 A1 | 6/2012 | Pingili et al. |
| 2012/0167159 A1 | 6/2012 | Mefford, Jr. et al. |
| 2012/0174237 A1 | 7/2012 | Krzyzanowski |
| 2012/0179802 A1 | 7/2012 | Narasimhan et al. |
| 2012/0179909 A1 | 7/2012 | Sagi et al. |
| 2012/0185910 A1 | 7/2012 | Miettinen et al. |
| 2012/0185913 A1 | 7/2012 | Martinez et al. |
| 2012/0191716 A1 | 7/2012 | Omoigui |
| 2012/0192181 A1 | 7/2012 | Gilbert et al. |
| 2012/0198570 A1 | 8/2012 | Joa et al. |
| 2012/0204220 A1 | 8/2012 | Lavi |
| 2012/0209949 A1 | 8/2012 | Deliyannis et al. |
| 2012/0210443 A1 | 8/2012 | Blaisdell et al. |
| 2012/0214472 A1 | 8/2012 | Tadayon et al. |
| 2012/0222120 A1 | 8/2012 | Rim et al. |
| 2012/0233130 A1 | 9/2012 | Vedachalam et al. |
| 2012/0238206 A1 | 9/2012 | Singh et al. |
| 2012/0238257 A1 | 9/2012 | Anson |
| 2012/0240183 A1 | 9/2012 | Sinha |
| 2012/0246191 A1 | 9/2012 | Xiong |
| 2012/0246484 A1 | 9/2012 | Blaisdell et al. |
| 2012/0246731 A1 | 9/2012 | Blaisdell et al. |
| 2012/0250106 A1 | 10/2012 | Kiran Kannambadi et al. |
| 2012/0254768 A1 | 10/2012 | Aggarwal et al. |
| 2012/0255026 A1 | 10/2012 | Baca et al. |
| 2012/0265528 A1 | 10/2012 | Gruber et al. |
| 2012/0265792 A1 | 10/2012 | Salters |
| 2012/0270522 A1 | 10/2012 | Laudermilch et al. |
| 2012/0272221 A1 | 10/2012 | Pessoa et al. |
| 2012/0278454 A1 | 11/2012 | Stewart et al. |
| 2012/0284325 A1 | 11/2012 | Erb |
| 2012/0284779 A1 | 11/2012 | Ingrassia, Jr. et al. |
| 2012/0290694 A9 | 11/2012 | Marl et al. |
| 2012/0291114 A1 | 11/2012 | Poliashenko et al. |
| 2012/0303476 A1 | 11/2012 | Krzyzanowski et al. |
| 2012/0303778 A1 | 11/2012 | Ahiska et al. |
| 2012/0304310 A1 | 11/2012 | Blaisdell |
| 2012/0311154 A1 | 12/2012 | Morgan |
| 2012/0311659 A1 | 12/2012 | Narain et al. |
| 2012/0317185 A1 | 12/2012 | Shah et al. |
| 2012/0321087 A1 | 12/2012 | Fleischman et al. |
| 2012/0324568 A1 | 12/2012 | Wyatt et al. |
| 2012/0331088 A1 | 12/2012 | O'Hare et al. |
| 2012/0331527 A1 | 12/2012 | Walters et al. |
| 2012/0331528 A1 | 12/2012 | Fu et al. |
| 2013/0002725 A1 | 1/2013 | Kim et al. |
| 2013/0007245 A1 | 1/2013 | Malik et al. |
| 2013/0007842 A1 | 1/2013 | Park et al. |
| 2013/0013653 A1 | 1/2013 | Thompson |
| 2013/0013688 A1 | 1/2013 | Wang et al. |
| 2013/0013727 A1 | 1/2013 | Walker |
| 2013/0013932 A1 | 1/2013 | Kong et al. |
| 2013/0014239 A1 | 1/2013 | Pieczul et al. |
| 2013/0014267 A1 | 1/2013 | Farrugia et al. |
| 2013/0019013 A1 | 1/2013 | Rice et al. |
| 2013/0019018 A1 | 1/2013 | Rice |
| 2013/0019282 A1 | 1/2013 | Rice et al. |
| 2013/0024424 A1 | 1/2013 | Prahlad et al. |
| 2013/0024928 A1 | 1/2013 | Burke et al. |
| 2013/0031544 A1 | 1/2013 | Sridharan et al. |
| 2013/0035063 A1 | 2/2013 | Fisk et al. |
| 2013/0042294 A1 | 2/2013 | Colvin et al. |
| 2013/0042295 A1 | 2/2013 | Kelly et al. |
| 2013/0054922 A1 | 2/2013 | Tuch et al. |
| 2013/0054962 A1 | 2/2013 | Chawla et al. |
| 2013/0055378 A1 | 2/2013 | Chang et al. |
| 2013/0059284 A1 | 3/2013 | Giedgowd, Jr. et al. |
| 2013/0066960 A1 | 3/2013 | Fieremans et al. |
| 2013/0066978 A1 | 3/2013 | Bentley et al. |
| 2013/0067229 A1 | 3/2013 | German et al. |
| 2013/0074142 A1 | 3/2013 | Brennan et al. |
| 2013/0078949 A1 | 3/2013 | Pecen et al. |
| 2013/0084847 A1 | 4/2013 | Tibbitts et al. |
| 2013/0086684 A1 | 4/2013 | Mohler |
| 2013/0088605 A1 | 4/2013 | Quarfordt et al. |
| 2013/0091205 A1 | 4/2013 | Kotler et al. |
| 2013/0091440 A1 | 4/2013 | Kotler et al. |
| 2013/0091543 A1 | 4/2013 | Wade et al. |
| 2013/0095785 A1 | 4/2013 | Sadana et al. |
| 2013/0097296 A1 | 4/2013 | Gehrmann et al. |
| 2013/0097421 A1 | 4/2013 | Lim |
| 2013/0097660 A1 | 4/2013 | Das et al. |
| 2013/0103797 A1 | 4/2013 | Park et al. |
| 2013/0111540 A1 | 5/2013 | Sabin |
| 2013/0117240 A1 | 5/2013 | Taylor et al. |
| 2013/0117563 A1 | 5/2013 | Grabelkovsky |
| 2013/0117805 A1 | 5/2013 | Kent et al. |
| 2013/0117840 A1 | 5/2013 | Roesner et al. |
| 2013/0124673 A1 | 5/2013 | Hjelm et al. |
| 2013/0130651 A1 | 5/2013 | Deasy et al. |
| 2013/0130652 A1 | 5/2013 | Deasy et al. |
| 2013/0130653 A1 | 5/2013 | Deasy et al. |
| 2013/0132457 A1 | 5/2013 | Diwakar |
| 2013/0132941 A1 | 5/2013 | Lindeman et al. |
| 2013/0133043 A1 | 5/2013 | Barkie et al. |
| 2013/0133061 A1 | 5/2013 | Fainkichen et al. |
| 2013/0138766 A1 | 5/2013 | Draluk et al. |
| 2013/0138810 A1 | 5/2013 | Binyamin et al. |
| 2013/0139241 A1 | 5/2013 | Leeder |
| 2013/0142043 A1 | 6/2013 | Tapia et al. |
| 2013/0144934 A1 | 6/2013 | Swett et al. |
| 2013/0145448 A1 | 6/2013 | Newell |
| 2013/0151598 A1 | 6/2013 | Fu et al. |
| 2013/0151681 A1 | 6/2013 | Dournov et al. |
| 2013/0167247 A1 | 6/2013 | Brown et al. |
| 2013/0171967 A1 | 7/2013 | Ashour et al. |
| 2013/0212212 A1 | 8/2013 | Addepalli et al. |
| 2013/0219022 A1 | 8/2013 | Manivel et al. |
| 2013/0219176 A1 | 8/2013 | Akella et al. |
| 2013/0219211 A1 | 8/2013 | Gopinath et al. |
| 2013/0219456 A1 | 8/2013 | Sharma et al. |
| 2013/0227551 A1 | 8/2013 | Tsirkin |
| 2013/0227561 A1 | 8/2013 | Walsh et al. |
| 2013/0227636 A1 | 8/2013 | Bettini et al. |
| 2013/0227659 A1 | 8/2013 | Raleigh |
| 2013/0232541 A1 | 9/2013 | Kapadia et al. |
| 2013/0237152 A1 | 9/2013 | Taggar et al. |
| 2013/0254262 A1 | 9/2013 | Udall |
| 2013/0254660 A1 | 9/2013 | Fujioka |
| 2013/0254831 A1 | 9/2013 | Roach et al. |
| 2013/0260730 A1 | 10/2013 | Toy et al. |
| 2013/0263208 A1 | 10/2013 | Challa |
| 2013/0263209 A1 | 10/2013 | Panuganty |
| 2013/0268676 A1 | 10/2013 | Martins et al. |
| 2013/0283335 A1 | 10/2013 | Lakshminarayanan et al. |
| 2013/0288656 A1 | 10/2013 | Schultz et al. |
| 2013/0290709 A1 | 10/2013 | Muppidi et al. |
| 2013/0291052 A1 | 10/2013 | Hadar et al. |
| 2013/0291055 A1 | 10/2013 | Muppidi et al. |
| 2013/0291086 A1 | 10/2013 | Pontillo et al. |
| 2013/0297604 A1 | 11/2013 | Sutedja et al. |
| 2013/0297662 A1 | 11/2013 | Sharma et al. |
| 2013/0298185 A1 | 11/2013 | Koneru et al. |
| 2013/0298201 A1 | 11/2013 | Aravindakshan et al. |
| 2013/0298242 A1 | 11/2013 | Kumar et al. |
| 2013/0303194 A1 | 11/2013 | Rowles |
| 2013/0305354 A1 | 11/2013 | King et al. |
| 2013/0311593 A1 | 11/2013 | Prince et al. |
| 2013/0311597 A1 | 11/2013 | Arrouye et al. |

(56) References Cited

U.S. PATENT DOCUMENTS

| | | |
|---|---|---|
| 2013/0318345 A1 | 11/2013 | Hengeveld |
| 2013/0333005 A1 | 12/2013 | Kim et al. |
| 2013/0346268 A1 | 12/2013 | Pereira et al. |
| 2013/0347130 A1 | 12/2013 | Sima |
| 2014/0006347 A1 | 1/2014 | Qureshi et al. |
| 2014/0006512 A1 | 1/2014 | Huang et al. |
| 2014/0007183 A1 | 1/2014 | Qureshi et al. |
| 2014/0007214 A1 | 1/2014 | Qureshi et al. |
| 2014/0007215 A1 | 1/2014 | Romano et al. |
| 2014/0007222 A1 | 1/2014 | Qureshi et al. |
| 2014/0020062 A1 | 1/2014 | Tumula et al. |
| 2014/0020073 A1 | 1/2014 | Ronda et al. |
| 2014/0032691 A1 | 1/2014 | Barton et al. |
| 2014/0032733 A1 | 1/2014 | Barton et al. |
| 2014/0032758 A1 | 1/2014 | Barton et al. |
| 2014/0032759 A1 | 1/2014 | Barton et al. |
| 2014/0033271 A1 | 1/2014 | Barton et al. |
| 2014/0040638 A1 | 2/2014 | Barton et al. |
| 2014/0040656 A1 | 2/2014 | Ho et al. |
| 2014/0040977 A1 | 2/2014 | Barton et al. |
| 2014/0040978 A1 | 2/2014 | Barton et al. |
| 2014/0040979 A1 | 2/2014 | Barton et al. |
| 2014/0047413 A1 | 2/2014 | Sheive et al. |
| 2014/0047535 A1 | 2/2014 | Parla et al. |
| 2014/0059640 A9 | 2/2014 | Raleigh et al. |
| 2014/0059642 A1 | 2/2014 | Deasy et al. |
| 2014/0096199 A1 | 4/2014 | Dave et al. |
| 2014/0108558 A1 | 4/2014 | Borzycki et al. |
| 2014/0108649 A1 | 4/2014 | Barton et al. |
| 2014/0109072 A1 | 4/2014 | Lang et al. |
| 2014/0109078 A1 | 4/2014 | Lang et al. |
| 2014/0111316 A1 | 4/2014 | Kim |
| 2014/0130174 A1 | 5/2014 | Celi, Jr. et al. |
| 2014/0149599 A1 | 5/2014 | Krishna et al. |
| 2014/0162614 A1 | 6/2014 | Lindeman et al. |
| 2014/0173700 A1 | 6/2014 | Awan et al. |
| 2014/0181803 A1 | 6/2014 | Cooper et al. |
| 2014/0181934 A1 | 6/2014 | Mayblum et al. |
| 2014/0189808 A1 | 7/2014 | Mahaffey et al. |
| 2014/0283030 A1 | 9/2014 | Moore et al. |
| 2014/0298401 A1 | 10/2014 | Batson et al. |
| 2014/0315536 A1 | 10/2014 | Chow et al. |
| 2014/0317273 A1 | 10/2014 | Kruglick |
| 2015/0026827 A1 | 1/2015 | Kao et al. |
| 2015/0087270 A1 | 3/2015 | Richardson et al. |
| 2015/0135160 A1 | 5/2015 | Gauvin et al. |
| 2017/0244724 A1 | 8/2017 | Deasy et al. |

FOREIGN PATENT DOCUMENTS

| | | |
|---|---|---|
| CN | 1661610 A | 8/2005 |
| CN | 1708751 A | 12/2005 |
| CN | 1713199 A | 12/2005 |
| CN | 1849774 A | 10/2006 |
| CN | 1951060 A | 4/2007 |
| CN | 101170401 A | 4/2008 |
| CN | 101305378 A | 11/2008 |
| CN | 101322379 A | 12/2008 |
| CN | 101350814 A | 1/2009 |
| CN | 101453708 A | 6/2009 |
| CN | 101572678 A | 11/2009 |
| CN | 101588353 A | 11/2009 |
| CN | 101727274 A | 6/2010 |
| CN | 101888597 A | 11/2010 |
| CN | 102422553 A | 4/2012 |
| CN | 102541635 A | 7/2012 |
| CN | 102591802 A | 7/2012 |
| CN | 102986190 A | 3/2013 |
| CN | 104854561 A | 8/2015 |
| EP | 1465039 A1 | 10/2004 |
| EP | 2403211 A1 | 1/2012 |
| EP | 2428894 A1 | 3/2012 |
| EP | 2523107 A1 | 11/2012 |
| GB | 2411320 A | 8/2005 |
| GB | 2462442 A | 2/2010 |
| JP | 11-205380 | 7/1999 |
| JP | 2003-296210 A | 10/2003 |
| JP | 2006-094258 A | 4/2006 |
| JP | 2006155522 A | 6/2006 |
| JP | 2007215201 A | 8/2007 |
| JP | 2008-033751 A | 2/2008 |
| JP | 2008-097419 A | 4/2008 |
| JP | 2008-160753 A | 7/2008 |
| JP | 2008-527574 A | 7/2008 |
| JP | 2009-070073 A | 4/2009 |
| JP | 2009-289164 A | 12/2009 |
| JP | 2010-015601 A | 1/2010 |
| JP | 2010-079901 A | 4/2010 |
| JP | 2011-138446 A | 7/2011 |
| JP | 2011-191897 A | 9/2011 |
| JP | 2011-248888 A | 12/2011 |
| KR | 10-0806993 B1 | 2/2008 |
| KR | 2012-0118819 A | 10/2012 |
| WO | 9914652 A1 | 3/1999 |
| WO | 02084460 A2 | 10/2002 |
| WO | 2004107646 A1 | 12/2004 |
| WO | 2007113709 A1 | 10/2007 |
| WO | 2008086611 A1 | 7/2008 |
| WO | 2009021200 A1 | 2/2009 |
| WO | 2010054258 A1 | 5/2010 |
| WO | 2010115289 A1 | 10/2010 |

OTHER PUBLICATIONS

Nov. 26, 2013—International Search Report and Written Opinion in International Application No. PCT/US2013/060388.

Apr. 2012—Xuetao Wei, et al., "Malicious Android Applications in the Enterprise: What Do They Do and How Do We Fix It?,"? ICDE Workshop on Secure Data Management on Smartphones and Mobiles, 4 pages.

2012—Ranjan et al., "Programming Cloud Resource Orchestration Framework: Operations and Research Challenges", arvix.org, pp. 1-19.

2010—Na et al., "Personal Cloud Computing Security Framework," 2010 IEEE Asia-Pacific Computing Conference, pp. 671-675.

2003—Wilson et al., "Unified Security Framework", In proceedings of the 1st International Symposium on Information and Communication Technologies, pp. 500-505. Trinity College Dublin.

2003—Mysore et al., "The Liquid Media System—a Multi-Device Streaming Media Orchestration Framework", Ubicomp 2003 Workshop, pp. 1-4.

Jan. 10, 2014—(PCT) Written Opinion and International Search Report, PCT/US2013/062636.

Feb. 4, 2014—International Search Report and Written Opinion in Application No. PCT/US2013/064349.

Jan. 21, 2014—International Search Report and Written Opinion in International Application No. PCT/US2013/063856.

Jan. 2013—Apple Inc., iPad User Guide for iOS 6.1 Software, Chapter 26, Accessibility, pp. 107-108.

Feb. 24, 2014—(PCT) International Search Report and Written Opinion—App PCT/US2013/060379.

Mar. 6, 2014—International Search Report and Written Opinion in International Application No. PCT/US2013/064319.

Feb. 6, 2014—International Search Report and Written opinion in International Application No. PCT/US2013/064076.

Mar. 17, 2014—International Search Report and Written Opinion in International Application No. PCT/US2013/064279.

Apr. 4, 2014—International Search Report and Written Opinion in International Application No. PCT/US2013/063429.

Jul. 31, 2012—"Citrix XenMobile Technology Overview: White Paper," Citrix White Papers online, pp. 1-14; retrieved from http://insight.com/content/aam/insight/en_US/pdfs/citrix/xenmobile-tech-overview.pdf, retrieved Jan. 27, 2014.

Jun. 3, 2014—Search Report and Written Opinion issued in International Application No. PCT/US2013/060047.

Jul. 1, 2011—Wright et al., "Your Firm's Mobile Devices: How Secure are They?" Journal of Corporate Accounting and Finance, Willey Periodicals. pp. 13-21.

(56) References Cited

OTHER PUBLICATIONS

Oct. 25, 2010—Andreas, "Digging into the Exchange ActiveSync Protocol," Mobility Dojo.net, http://mobilitydojo.net/2010/03/17/digging-into-the-exchange-activesync-protocol/.
Oct. 20, 2014—(PCT) International Search Report—App PCT/US2014/036382.
Sep. 29, 2014—(PCT) International Search Report—App PCT/US2014/036326.
Dec. 20, 2013—(PCT) International Search Report and Written Opinion—App PCT/US2013/063363.
Jul. 11, 2014—(PCT) Written Opinion and International Search Report—App PCT/US13/63261.
2011—Laverty, Joseph Packy et al., "Comparative Analysis of Mobile Application Development and Security Models," Issues in Information Systems vol. XII, No. 1, [Retrieved from the Internet] <http://iacis.org/iis/2011/301-312_AL2011_1694.pdf> pp. 301-312.
2012—Potharaju, Rahul et al., "Plagiarizing smartphone applications: attack strategies and defense techniques," [Online] Engineering Secure Software and Systems, Springer Berlin Heidelberg, [Retrieved from the Internet] <http://link.springer.com/chapter/10.1007/978-3-642-28166-2_11#> pp. 106-120.
1998—Peine, H., "Security concepts and implementation in the Ara mobile agent system," [Online] 1998, Enabling Technologies: Infrastructure for Collaborative Enterprises, Seventh IEEE International Workshops on Jun. 17-19, 1998, [Retrieved from the Internet] <http://ieeexplore.ieee.org/stamp/stamp.jsp?tp=&arnumber=725699&isnumber=15665> pp. 236-242.
2006—Shah et al., "Securing Java-Based Mobile Agents through Byte Code Obfuscation Techniques," [Online] Dec. 23-24, 2006, Multitopic Conference, 2006, INMIC '06. IEEE, [Retrieved from the Internet] <http://ieeexplore.ieee.org/stamp/stamp.jsp?tp=&arnumber=4196425&isnumber=414013> pp. 305-308.
2008—Administration Guide for Symantec Endpoint Protection and Symantec Network Access Control; Retrieved from the Internet <<URL:ftp.symantec.com/public/english_us_canada/products/symantec_endpoint_protection/11.0/manuals/administration_guide.pdf>; pp. 1-615.
2007—Symantec Network Access Control Enforcer Implementation Guide; Retrieved from the Internet <URL:ftp.symantec.com/public/english_us_canada/products/symantec_network_access_control/11.0/manuals/enforcer_implementation_guide.pdf>; pp. 1-132.
Nov. 5, 2015—(EP) Office Action—App 13773923.1.
Aug. 1, 2012—"TPS Development Using the Microsoft .NET Framework", Teresa P. Lopes, IEEE Instrumentation & Measurement Magazine (vol. 15, No. 4).
Apr. 28, 2003—"Managed, Unmanaged, Native: What Kind of Good is This?", Kate Gregory, Developer.com, Retrieved from internet: http://www.developer.com/print.php/2197621.
Jul. 31, 2012—Citrix: "Citrix XenMobile Technology Overview White Paper"; Citrix White papers online, pp. 1-14, XP055098728, Retrieved from the Internet: URL:http://www.insight.com/content/dam/onsight/en_US/pdfs/citrix/xenmobile-tech-overview.pdf, [retrieved on Jan. 27, 2014] the whole document.
Aug. 1, 2012—Teresa P. Lopes et al: "TPS development using the Microsoft .NET framework", IEEE Instrumentation & Measurement Magazine, IEEE Service Center, Piscataway, NJ; US, vol. 15, No. 4, pp. 34-39, XP011456193, ISSN: 1094-6969, DOI: 10.1109/MIM.2012.6263982, the whole document.
Apr. 28, 2003—Kate Gregory: "Managed, Unmanaged, Native: What Kind of Code is This?", Developer.com, pp. 1-3, XP055096991, retrieved from the Internet: <URL:http://www.developer.com/print.php/2197621>, [retrieved on Jan. 17, 2014], the whole document.
Feb. 10, 2014—(PCT) Search Report—App PCT/US/2013/065245.
Mar. 25, 2016—(CN) Office Action—App 201380057326.1.
2005—Hamed, H. et al., "Modeling and verification of IPSec and VPN security policies," 13th IEEE International Conference on Network Protocols (ICNP'05), pp. 10.

Nov. 2004—Skarmeta, A. et al., "Policy-based dynamic provision of IP services in a secure VPN coalition scenario," in IEEE Communications Magazine, vol. 42, No. 11, pp. 118-124.
Jun. 20, 2016—(EP) Extended European Search Report—App 13795317.
Nov. 13, 2015—International Search Report and Written Opinion of International Application No. PCT/US2015/026781.
Mar. 11, 2008—Vejda, T. et al., "Towards Trust Services for Language-Based Virtual Machines for Grid Computing," Trusted Computing—Challenges and Applications, ISBN: 978-3-540-68978-2.
Jul. 7, 2016—(EP) Supplementary European Search Report—App 13795317.0.
Jul. 29, 2016—(KR) Office Action—App. 10-2015-7031152.
Symantec: "What are Managed Applications and What is the Difference Between Assigned and Published;" Jan. 7, 2002; pp. 1-5.
Tilakgovind: "Understanding the Difference Between .exe and .msi: Symantec Connect;" Jan. 15, 2008.
Oct. 11, 2016—International Search Report and Written Opinion—App No. PCT/US2016/039229.
Nov. 1, 2016 (KR) Office Action—App. 10-2012-7001062.
Oct. 28, 2016 (JP) Notice of Reasons for Refusal—App. 2016-505458.
Oct. 28, 2016 (JP) Notification of Reason for Refusal—App. 2016-505457.
Oct. 14, 2016—(KR) Office Action—App 10-2015-7031149.
Jan. 19, 2017 (JP) Notification of Reasons for Refusal—App. 2016-505456.
Feb. 21, 2017—(CN) First Chinese Office Action—App. 2013800657267.
Feb. 8, 2017—(CN) First Office Action—App No. 2013800641911—Eng Trans.
Apr. 18, 2017—(CN) Office Action—App 201380063087.0.
May 3, 2017 (CN) Decision of Rejection—App 2013800573261.
May 31, 2017 (CN) First Office Action—App. 201380077065.X.
Jun. 14, 2017 (KR) Korean Intellectual Property Office Notice to Submit a Response—App. 10-2015-7031148.
Jun. 9, 2017—(CN) First Office Action—App 2013800627647.
Jul. 27, 2017—U.S. Final Office Action—U.S. Appl. No. 14/021,227.
Jul. 3, 2017—(CN) Second Office Action—App 2013800641911.
Aug. 3, 2017—(JP) Office Action—App 2016-512957.
Ikuki Matsuhisa, Telecommunication, RIC TELECOM, Sep. 25, 2011, vol. 28, No. 10, p. 66-69.
Sep. 22, 2017—U.S. Non-final Office Action—U.S. Appl. No. 14/055,038.
Oct. 3, 2017—U.S. Non-final Office Action—U.S. Appl. No. 15/057,314.
Dec. 4, 2017—U.S. Notice of Allowance—U.S. Appl. No. 14/875,450.
Nov. 30, 2017—(JP) Notification of Reasons for Refusal—App 2016-226192.
"General review of latest approaches for BYOD Safely use business apps from personal terminal," Nikkei Communication, Nikkei Business Publications, Inc., Jun. 1, 2012, No. 581, pp. 27-37.
Nov. 13, 2017—(CN) Decision of Rejection—App No. 2013800641911.
Dec. 15, 2017—U.S. Non-final Office Action—U.S. Appl. No. 14/876,832.
Dec. 15, 2017—U.S. Final Office Action—U.S. Appl. No. 15/345,584.
Dec. 14, 2017—U.S. Notice of Allowance—U.S. Appl. No. 15/189,197.
Jan. 12, 2009—"Safeguarding removable-media devices," Sever.
Aug. 25, 2011—"A mobile and portable trusted computing platform," Nepal et al.
Sep. 2003—"Securing wireless access to mobile applications," Phifer.
Jan. 11, 2018—U.S. Notice of Allowance—U.S. Appl. No. 14/752,132.
2009—"Policy-Based Security Configuration Management Application to Intrusion Dection and Prevention," Alsubhi, Khalid et al., pp. 1-6.

(56) References Cited

OTHER PUBLICATIONS

Mar./Apr. 2002—"Simplifying Network Administration Using Policy-Based Management," Verma, Dinesh C. et al.
2004—"Policy Transformation Techniques in Policy-based Systems Management," Beigi, Mandis S., et al., pp. 1-10.
2006—"Middleware Support for Auditing Service Process Flows," Hacigumus, Hakan, pp. 24-29.
Oct. 2005—"Policy-Based Management of Networked Computing Systems," Agrawal, Dakshi et al., pp. 69-75.
Nov./Dec. 1999—"Conflicts in Policy-Based Distributed Systems Management," Lupu, Emil et al., pp. 852-869.
Jan. 22, 2018—U.S. Final Office Action—U.S. Appl. No. 14/932,293.
Jan. 25, 2018—U.S. Notice of Allowance—U.S. Appl. No. 14/025,898.
Mar. 9, 2018—U.S. Non-final Office Action—U.S. Appl. No. 14/021,227.
Dec. 26, 2017—(CN) Notice of First Office Action—App 201380076963.3.
Jan. 25, 2018—(EP) Examination Report—App 13795317.0.
Jan. 31, 2018 (EP) Examination Report—App. 13780489.4.
Feb. 5, 2018—(EP)—Examination Report—App 13795021.8.

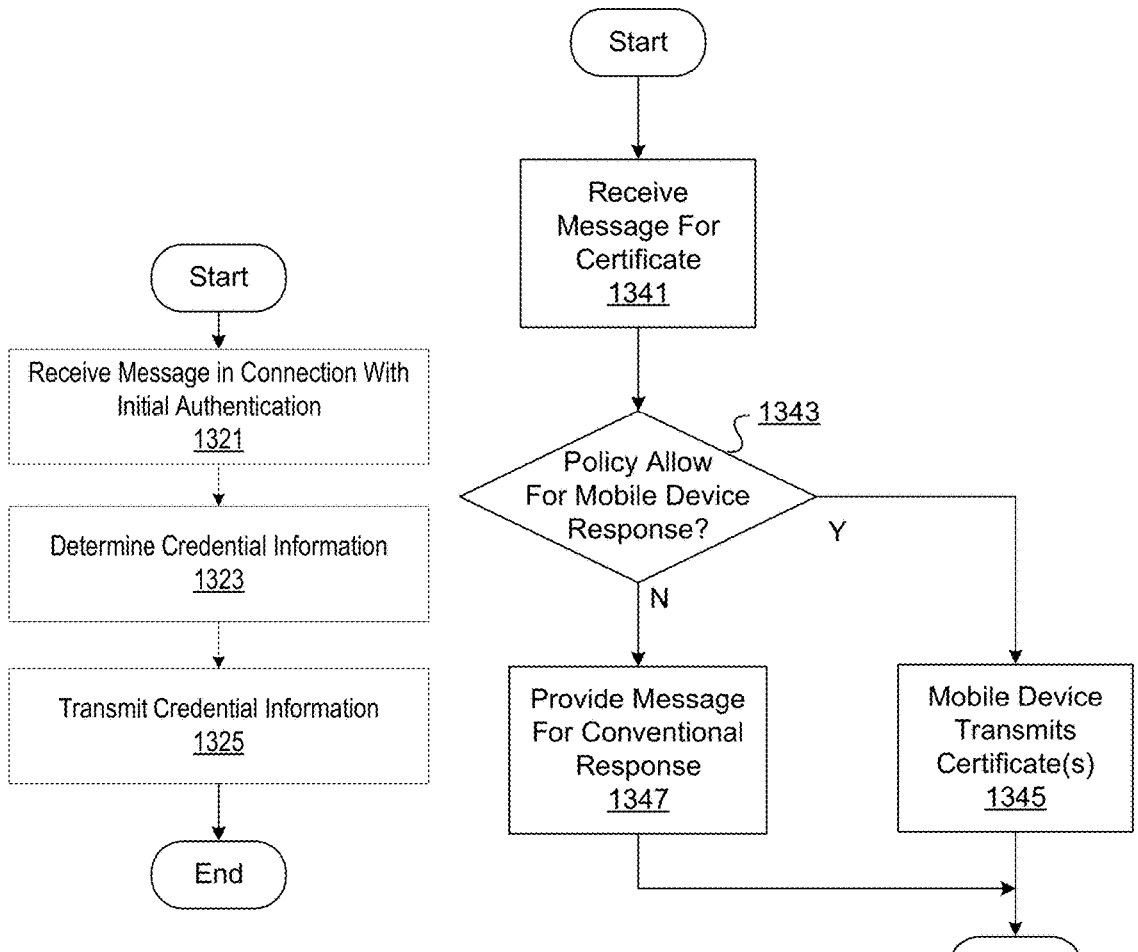

PROVIDING VIRTUALIZED PRIVATE NETWORK TUNNELS

CROSS-REFERENCE TO RELATED APPLICATIONS

This application is a continuation of and claims priority to U.S. Non-Provisional patent application Ser. No. 14/535,597, filed Nov. 7, 2014, entitled "PROVIDING VIRTUALIZED PRIVATE NETWORK TUNNELS," which is a continuation of and claims priority to U.S. Non-Provisional application Ser. No. 14/029,068, filed Sep. 17, 2014 (now U.S. Pat. No. 8,914,845), entitled "PROVIDING VIRTUALIZED PRIVATE NETWORK TUNNELS," which is a continuation of and claims priority to U.S. Non-Provisional patent application Ser. No. 14/027,929, filed Sep. 16, 2013, entitled "PROVIDING VIRTUALIZED PRIVATE NETWORK TUNNELS," which claims the benefit of: U.S. Provisional Patent Application Ser. No. 61/861,909, filed Aug. 2, 2013, and entitled "PROVIDING VIRTUALIZED PRIVATE NETWORK TUNNELS;" U.S. Provisional Patent Application Ser. No. 61/713,763, filed Oct. 15, 2012, and entitled "PER-APPLICATION POLICY-CONTROLLED ACCESS TO COMPUTERIZED RESOURCES;" and U.S. Provisional Patent Application Ser. No. 61/806,577, filed Mar. 29, 2013, and entitled "SYSTEMS AND METHODS FOR ENTERPRISE MOBILITY MANAGEMENT."

Each of the above-mentioned patent applications is incorporated by reference herein in its entirety.

BACKGROUND

Aspects of the disclosure relate to computer hardware and software. In particular, one or more aspects of the disclosure generally relate to computer hardware and software for providing an enterprise application store.

Increasingly, corporations and other organizations are providing and/or otherwise enabling their employees and other associates with mobile devices, such as smart phones, tablet computers, and other mobile computing devices. As these devices continue to grow in popularity and provide an increasing number of functions, many organizations may wish to place certain controls on how these devices can be used, what resources these devices can access, and how the applications running on these devices can interact with other resources.

SUMMARY

Aspects of the disclosure provide more efficient, effective, functional, and convenient ways of controlling how mobile devices can be used, what resources mobile devices can access, and how the applications running on these devices can interact with other resources. In particular, in one or more embodiments discussed in greater detail below, an enterprise application store may be implemented that can provide these and features.

Various aspects of the disclosure relate to providing a per-application policy-controlled VPN tunnel. In some embodiments, tickets may be used to provide access to an enterprise resource without separate authentication of the application. For example, some aspects may relate to a mobile device receiving policy information that describes one or more policies for providing an application of the mobile device with access to at least one resource accessible through an access gateway; determining that the mobile device has a ticket that is valid, said ticket being configured to provide authentication in connection with creating a virtual private network (VPN) tunnel for the application to said at least one resource; analyzing policy information to determine that network access to the at least one resource is permitted; transmitting the ticket to the access gateway; and creating the VPN tunnel for the application to access said at least one resource.

Additional aspects may relate to updating policy information and transmitting a ticket for a managed application to a mobile device. For example, some aspects may relate to one or more computing devices, such as an access gateway, performing an update to policy information stored at an access gateway, wherein the policy information describes one or more policies for providing an application of a mobile device with access to at least one enterprise resource accessible through the access gateway, said update resulting in updated policy information; determining to transmit updated policy information to the mobile device; transmitting the updated policy information to the mobile device; transmitting a ticket to the mobile device, said ticket being configured to provide authentication in connection with creating a virtual private network (VPN) tunnel for the application to said at least one resource; and opening the VPN tunnel to provide the application with access to the at least one resource.

Further aspects may relate to performing a deletion of tickets or other data associated with the mobile device, such as by performing a selective wipe. For example, some aspects may relate to a mobile device storing a ticket in a secure container usable to store data related to a managed application being provided by the mobile device, wherein the ticket is configured to provide authentication in connection with creating a virtual private network (VPN) tunnel for the managed application to at least one resource accessible through an access gateway; providing the managed application with access to the at least one resource based on the ticket, the VPN tunnel, and policy information that describes one or more policies for providing the managed application of the apparatus with access to the at least one resource; determining to perform a selective wipe; determining that the ticket is stored by the mobile device; and deleting the ticket from the secure container.

Yet further aspects may relate to operating a managed application in at least two modes of operation and providing access to resources via a per-application policy controlled virtual private network tunnel in at least one of the modes of operation. For example, some aspects may relate to a mobile device determining a context for a managed application; based on at least two different operating modes, determining an operation mode for the managed application based on the context; executing the managed application in the operation mode; and providing the managed application with access to at least one resource accessible through an access gateway based at least on a virtual private network (VPN) tunnel for the managed application to the at least one resource, a ticket configured to provide authentication in connection with creating the VPN tunnel, and policy information that describes one or more policies for providing the managed application of the apparatus with access to the at least one resource.

Further aspects may relate to responding to authentication challenges automatically or instead of the user or managed application. For example, some aspects may relate to a mobile device receiving an authentication challenge in connection with an authentication process for a managed application; analyzing policy information to determine that the policy information allows the mobile device to respond to the authentication challenge instead of a user or the managed application, wherein the policy information describes one or more policies for providing the managed application with access to at least one resource accessible through an access gateway; responding, by the mobile device, to the authentication challenge instead of the user or the managed application; and providing the managed application with access to the at least one resource based at least on a virtual private network (VPN) tunnel for the managed application to the at least one resource, a ticket configured to provide authentication in connection with creating the VPN tunnel, and the policy information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 13A-13C illustrate example methods for providing authentication-related functionality in accordance with various aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, various aspects of the disclosure relate to providing a per-application policy-controlled VPN tunnel. In some embodiments, tickets may be used to provide access to an enterprise resource without separate authentication of the application and, in some instances, can be used in such a manner as to provide a seamless experience to the user when reestablishing a per-application policy controlled VPN tunnel during the lifetime of the ticket. Additional aspects relate to an access gateway providing updated policy information and tickets to a mobile device. Other aspects relate to selectively wiping the tickets from a secure container of the mobile device. Yet further aspects relate to operating applications in multiple modes, such as a managed mode and an unmanaged mode, and providing authentication-related services based on one or more of the above aspects.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
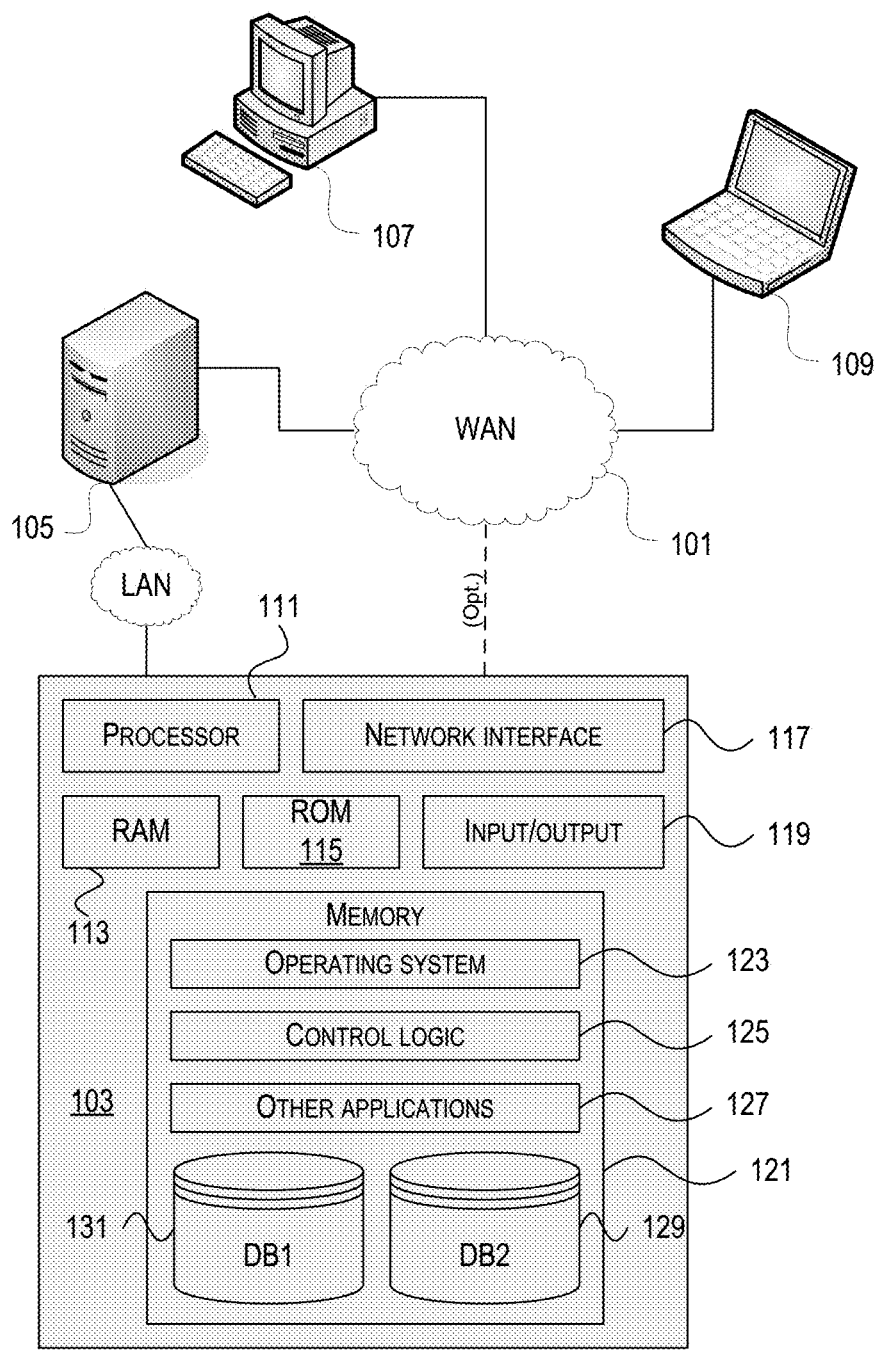
FIG. 1 depicts an illustrative computer system architecture that may be used in accordance with one or more aspects of the disclosure.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
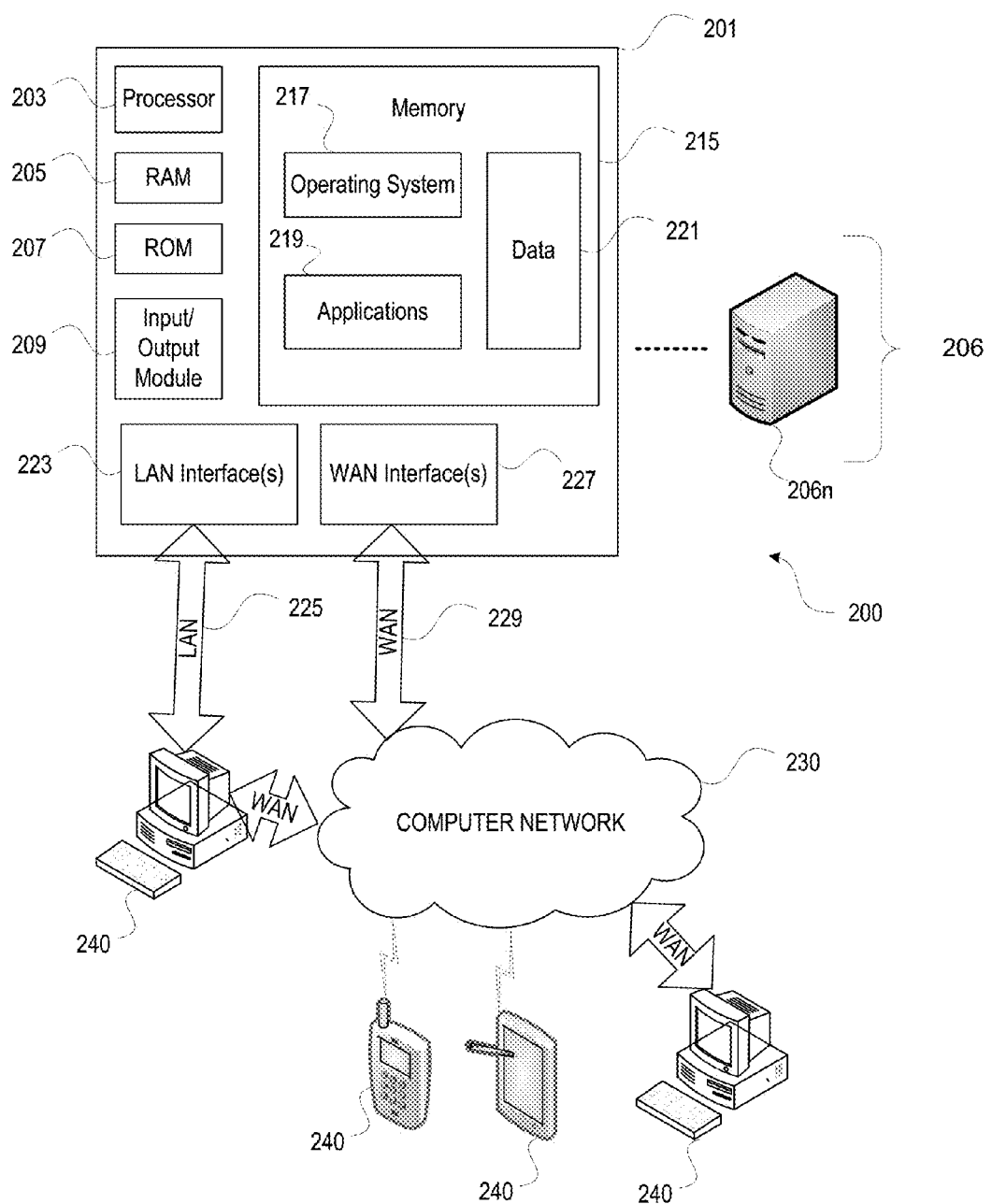
FIG. 2 depicts an illustrative remote-access system architecture that may be used in accordance with various aspects of the disclosure.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206*a* in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
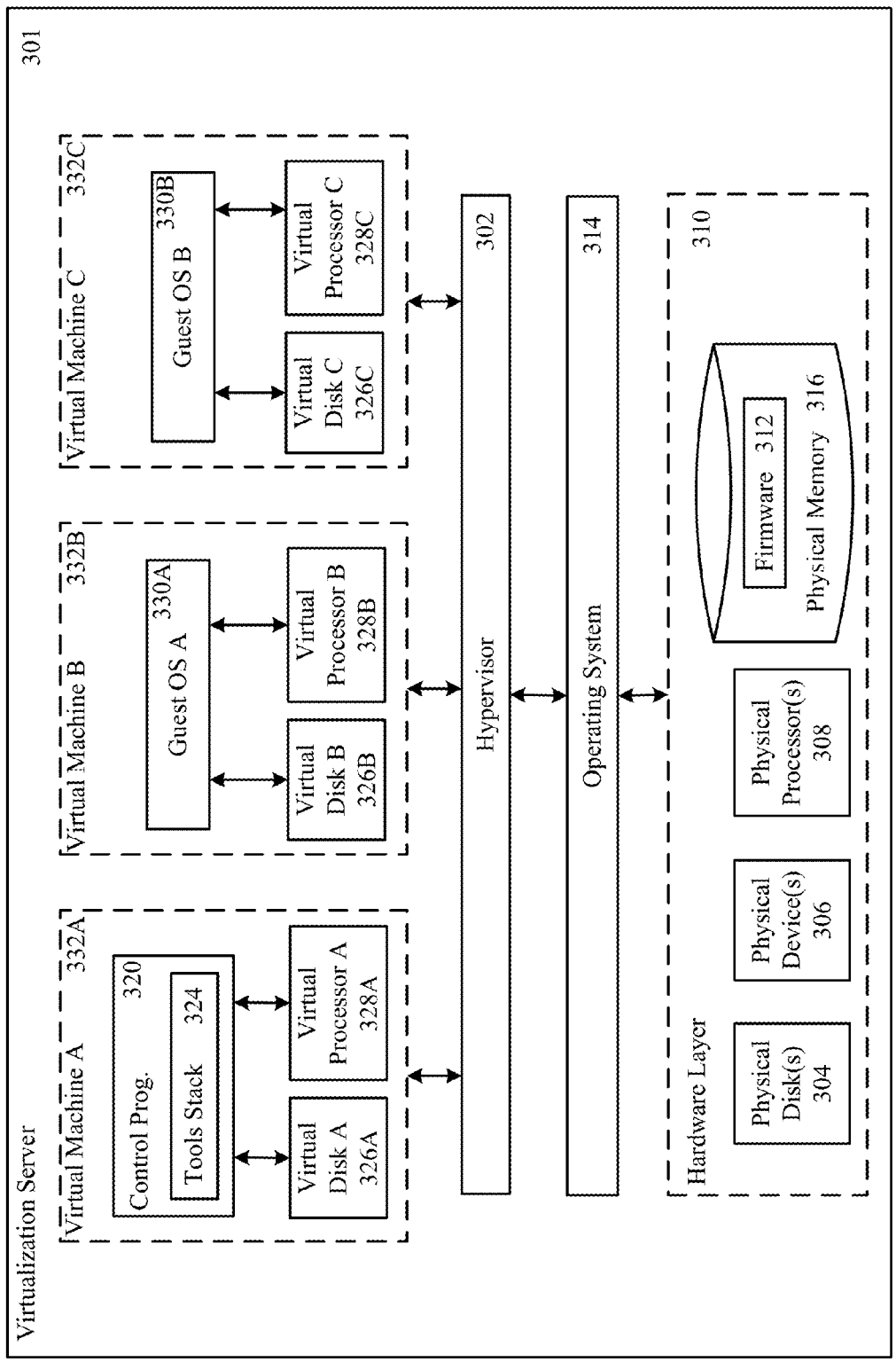
FIG. 3 depicts an illustrative virtualized (hypervisor) system architecture that may be used in accordance one or more aspects of the disclosure.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
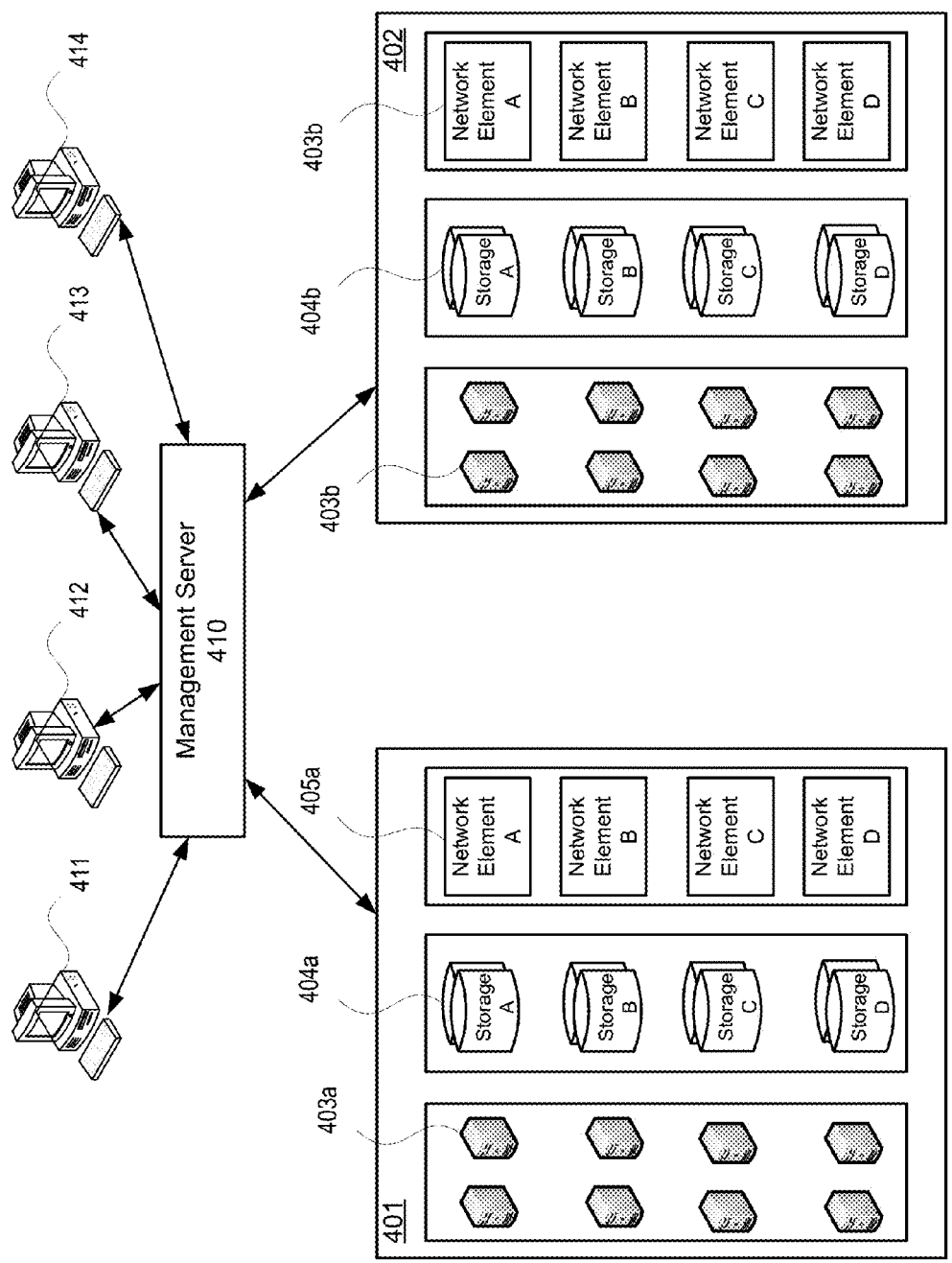
FIG. 4 depicts an illustrative cloud-based system architecture that may be used in accordance various aspects of the disclosure.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., webbased on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
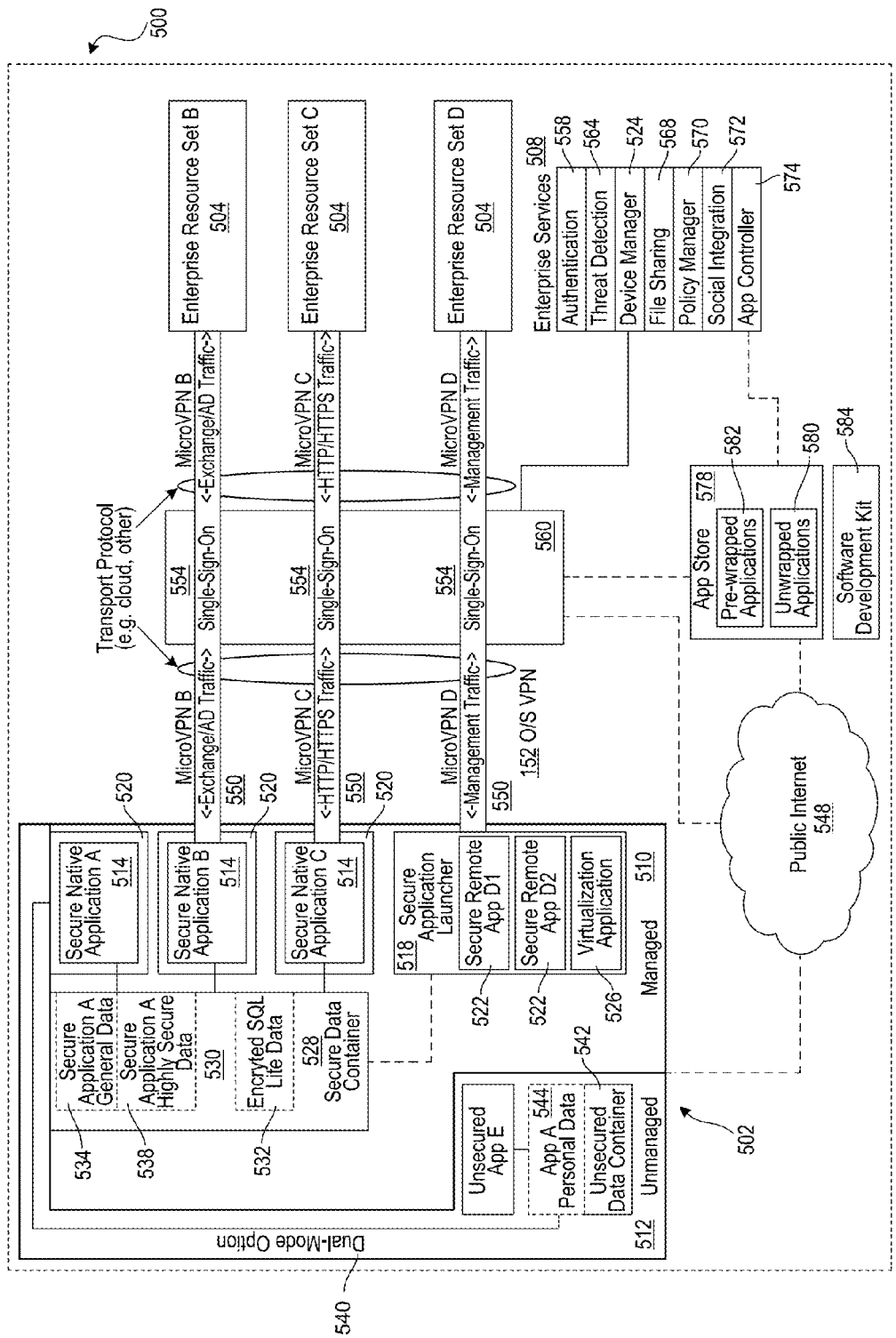
FIG. 5 depicts an illustrative enterprise mobility management system that may be used in accordance with one or more aspects of the disclosure.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as a managed device or an enrolled device.

The operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The applications running on the managed partition may be stabilized applications. The stabilized applications may be managed by a device manager 524. The device manager 524 may monitor the stabilized applications and utilize techniques for detecting and remedying problems that would result in a destabilized application if such techniques were not utilized to detect and remedy the problems.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections such as, for example, a microVPN or application-specific VPN. The virtual private network connections may be specific to particular applications 550, particular devices, particular secured areas on the mobile device, and the like 552. For example, each of the wrapped applications in the secured area of the phone may access enterprise resources through an application-specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
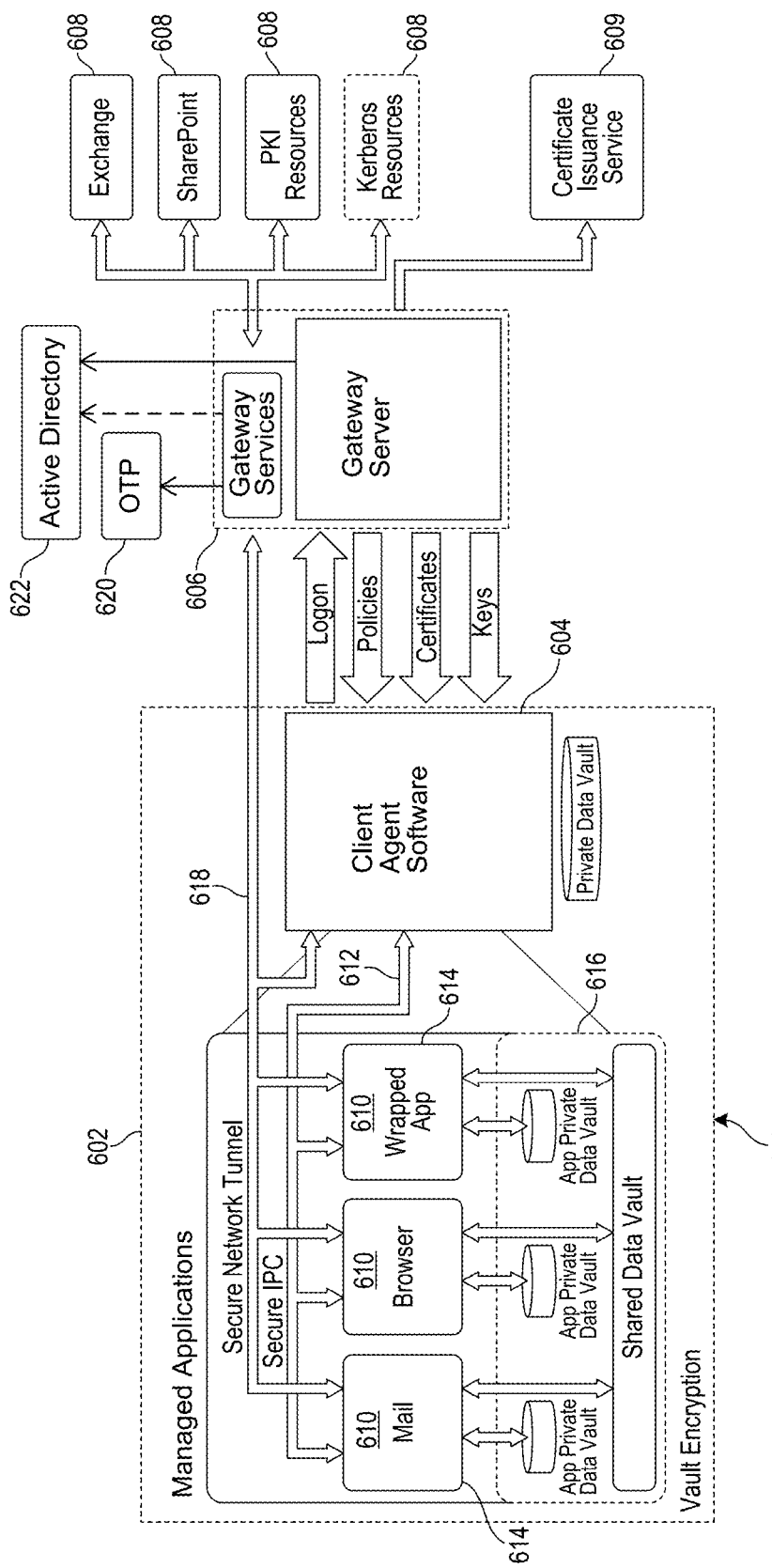
FIG. 6 depicts another illustrative enterprise mobility management system that may be used in accordance with various aspects of the disclosure.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes access gateway and application controller functionality) to access various enterprise resources 608 and services 609 such as Exchange, Sharepoint, PKI Resources, Kerberos Resources, Certificate Issuance service, as shown on the right hand side above. Although not specifically shown, the mobile device 602 may also interact with an enterprise application store for the selection and downloading of applications.

The client agent 604 acts as the UI (user interface) intermediary for Windows apps/desktops hosted in an Enterprise data center, which are accessed using the HDX/ICA display remoting protocol. The client agent 604 also supports the installation and management of native applications on the mobile device 602, such as native iOS or Android applications. For example, the managed applications 610 (mail, browser, wrapped application, secure container to which a VPN, such as an application-specific policy-controlled VPN can connect to) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The Secure IPC links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key Derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want an enterprise application to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a PKCS 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka CVPN) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of an enterprise application and application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Illustrative Embodiment(s)

Figure 7:
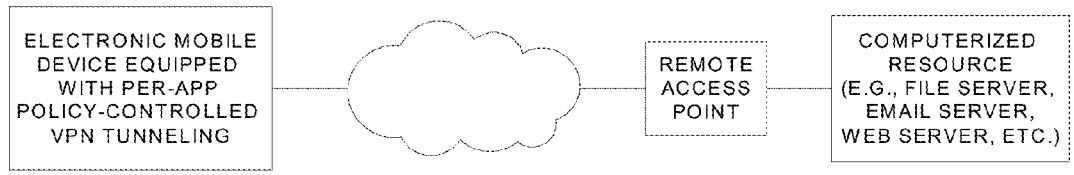
FIG. 7 shows an electronic environment which enables an electronic mobile device to securely access a computerized resource via per-app policy-controlled VPN tunneling according to one or more aspects of the disclosure.

FIG. 7 shows an electronic environment which enables an electronic mobile device to securely access a computerized resource via per-application policy-controlled VPN tunneling. The cloud represents a communications medium (e.g., a wireless computer network, the Internet, a cellular network, combinations thereof, and so on) which enables the electronic mobile device to communicate with the remote access point.

Figure 8:
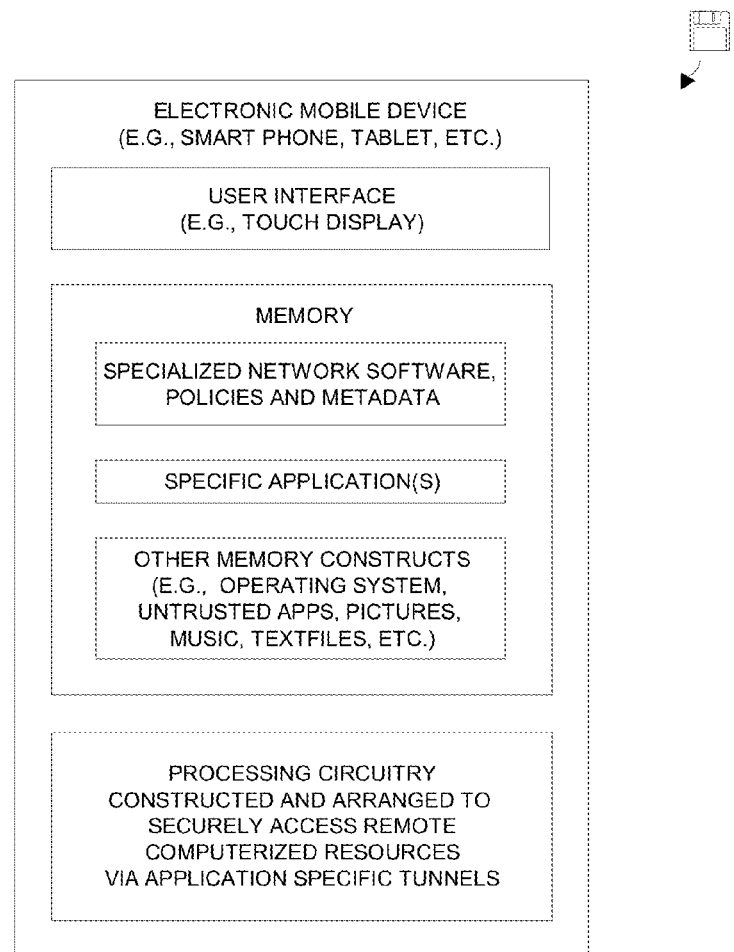
FIG. 8 shows particular details of one embodiment of a suitable mobile electronic device on which aspects related to securely accessing a computerized resource may be practiced in accordance with various aspects of the disclosure.

FIG. 8 shows particular details of one embodiment of a suitable mobile electronic device on which aspects related to securely accessing a computerized resource, such as those shown in FIG. 7, may be practiced. As shown, the electronic mobile device includes, among other things, a user interface for user input/output, memory to store information, and processing circuitry. Examples of suitable mobile devices include smart phones, tablet devices, electronic notebooks, and so on. Furthermore, various specific platforms are suitable for use such as those running iOS provided by Apple Computer, Android provided by Google, and Windows provided by Microsoft are suitable.

During operation, the mobile device builds per-application policy-controlled VPN-style connections between the specific applications and a remote access point (e.g., a VPN server, a gateway, an individual computer, etc.).

Figure 9:
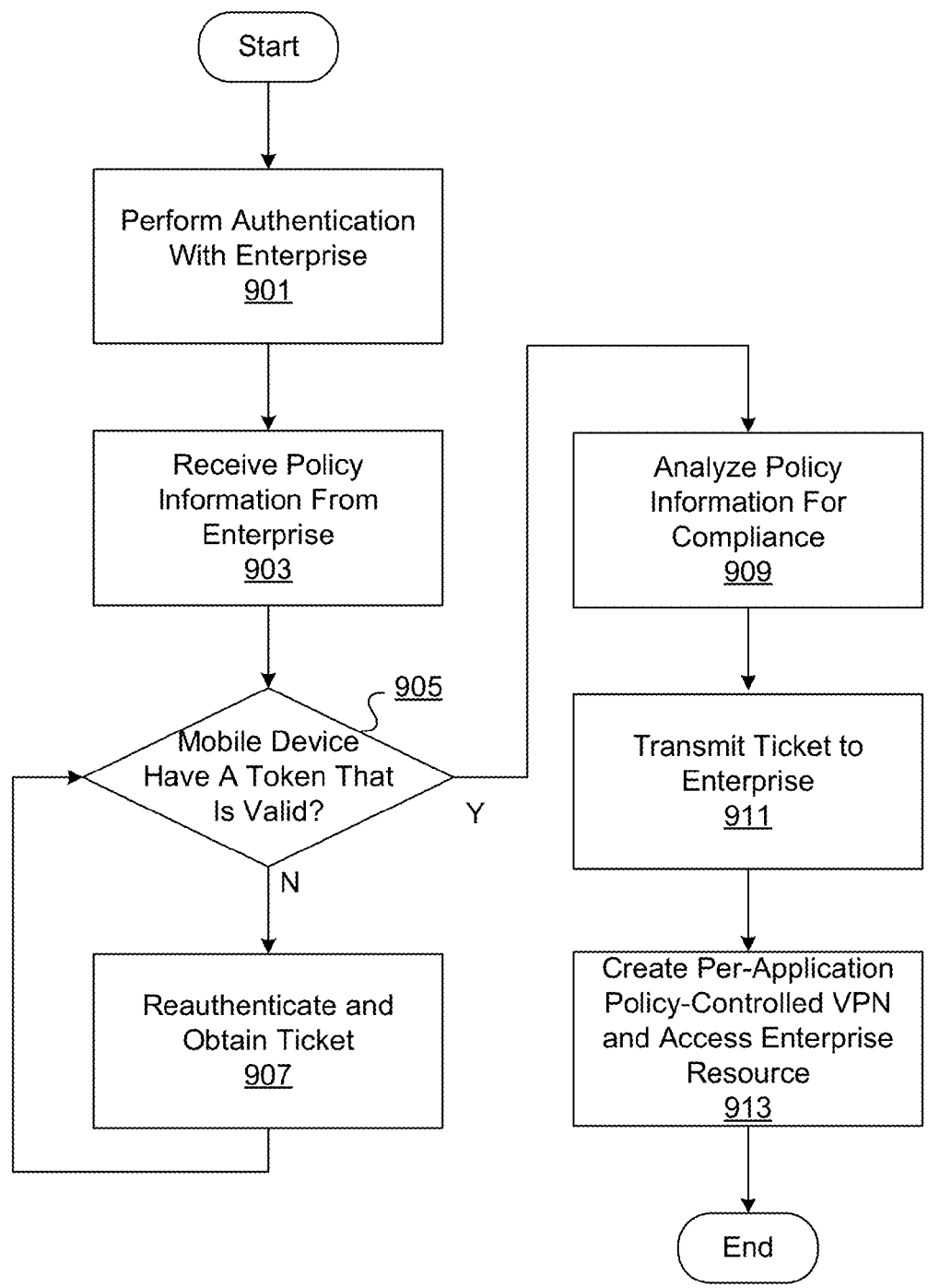
FIG. 9 illustrates a method that enables a mobile electronic device to access a computerized resource via an application specific tunnel according to one or more aspects described herein.

FIG. 9 illustrates a method that is performed by the processing circuitry of the mobile device when operating in accordance with various software constructs stored in the memory of the mobile device. In particular, the method enables the mobile device to access a computerized resource via an application specific tunnel.

Access to enterprise servers is not a problem when the mobile device is connected directly to a private wireless network or LAN. But when the user's device is connected to a foreign network such as 3G/4G network, home-based WiFi, or other public access point, transparent network access to corporate intranet is problematic without a VPN. However, because a system level VPN gives access to all the mobile device applications uniformly, a better solution for managed enterprise applications is a per-application VPN technology that can be policy controlled. In this case, VPN access is granted to specific users and applications on the mobile electronic device only based on each employee's role within the organization. Non-enterprise applications would have no awareness of or access to resources inside of the corporate intranet through this per-application VPN connection.

Many mobile resource management (MRM) solutions (also referred to herein as EMM, MDM and MAM, each of which may include MRM) offer a virtual private network (VPN) solution as the mechanism for providing such access. However, traditional VPNs have the downside that all applications running on the mobile device are granted uniform access to the corporate intranet. Increasingly, mobile devices used to access enterprise resources are employee owned and not enrolled with an MDM server, and therefore not tightly controlled or managed by a corporate IT department. As such, there is a real risk of malware and other unauthorized software running on an employee's own mobile device to gain access to the corporate intranet when using traditional VPN software. Traditional system level VPN solutions do not discriminate between trusted and untrusted applications. By building in a per-application policy-controlled VPN solution, enterprises can ensure that only authorized applications for authorized users in specifically configured access scenarios are able to access corporate intranet resources from a foreign network.

In addition, by adjusting policy files, an enterprise can make policy decisions regarding whether to allow a MicroVPN, disallow a MicroVPN, or tunnel data from specific managed applications to and from the enterprise servers. Additionally, an enterprise can control network access of a device at different levels of specificity. For example, one policy that can be used for an application is to let the application connect to enterprise resources from any network, including foreign networks. Another policy could be used that specifies an application can only access enterprise resources via a microVPN tunnel. A VPN tunnel may also be referred herein as a VPN connection.

At step 901, the mobile device may perform authentication with the enterprise and may include authenticating the user and/or the mobile device. A variety of authentication techniques may be employed, such as single sign-on (SSO) credentials, and some techniques may require a user to supply usernames and/or passwords, or other form of credential. In addition, mobile device and/or access gateway may intercept network traffic based on policy information and/or based on certificates associated with the user/device, and/or may respond to authentication challenges by virtue of seeing network level conversation. A mobile device, in some embodiments, is typically challenged to authenticate the user's corporate identity along with passwords and other factors as dictated by corporate policy.

In some arrangements, the mobile device may receive policy information from the enterprise, as illustrated at step 903 (e.g., the method proceeds from step 901 to step 903). In some arrangements, the mobile device may request the policy information after successfully authenticating for the first time. In others, the mobile device may request the policy information every time upon starting to manage execution of the application. The access manager components of the enterprise may transmit the policy information (e.g., a policy that has been established by the enterprise administrator for this user when requesting access to the enterprise resource) to the mobile device.

Additionally, the policy information may include one or more policies specific to the application (e.g., specifying network access for only the application). The application-specific policies may be cached (e.g., in a secure container) and periodically refreshed to ensure compliance with administrative settings. These application-specific policies may further restrict access to the enterprise resource only during certain times, from certain networks, form certain geolocations, and only from devices that are in compliance with all organizations security policies.

The policy information may also include one or more policies that constrain or provide privileges to the VPN tunnel. For example, the policy information may define the type or level of encryption that is to be applied to data transmitted via the tunnel. The policy may specify that an application may only access enterprise resources via a VPN tunnel, including a per-application policy-controlled VPN tunnel.

The policy information may include one or more policies that constrain what data traffic should use a VPN tunnel. For example, a policy may include a tunnel setting that can be defined as on or off. When the split tunnel setting is set to on, the access gateway may control what data must be transmitted via an application specific VPN tunnel and what data can be transmitted in other ways (e.g., normal VPN connection or using an unsecured connection). The access gateway, in some embodiments, may make the determination based on the destination of the data (e.g., the uniform resource locator (URL) of the destination that the data is being transmitted to) or the resource that is being accessed. The access gateway may communicate its determination to the mobile device either when transmitting the policy information or when the mobile device attempts to send the data or access the resource.

The policy information may include one or more policies that constrain what authentication information is required to access a resource or create an application specific VPN tunnel. Different policies may require different levels of authentication, such as requiring a higher security authentication process when attempting to access highly sensitive data/resources than the authentication process that is required for accessing other data/resources. For example, a policy may specify that a valid ticket must be received from the managed device before the resource can be accessed or the application specific VPN tunnel can be created. Alternatively, the policy may also specify that the managed device is to proceed through an authentication process (e.g., repeat an initial authentication process) prior to creating an application-specific VPN tunnel. In addition to the specified authentication process, the policy may also require the managed device to supply a valid username and password prior to accessing the resource or creating the application-specific VPN tunnel. Other forms of authentication that can be specified by policy include multi-factor schemes, single factor schemes, biometric schemes, passcode schemes, risk-based authentication schemes, and the like. The policy may also specify optional authentication schemes that if completed allow the managed device or managed application with additional privileges, such as access to highly protected resources or access to tickets with a longer validity duration.

The previous steps may, in some variations, illustrate steps performed by the mobile device to setup, initialize or maintain the management of an application. For example, the above steps may be performed when a user first tries to access the enterprise resource using the application or the first time the application executes on the mobile device. The above steps may be performed periodically or as-needed by the mobile device to maintain proper authentication and stay up to date on policy information. An enterprise, or enterprise operator (e.g., IT technician) may be able to signal a mobile device to re-authenticate or update policy information.

At step 905, the mobile device may determine whether the mobile device has a token or ticket that is valid. Such tickets or tokens (these terms will be used interchangeably herein) are offered in order to authenticate the user in a transparent manner. That is, one or more tickets are provided to the mobile device from the enterprise in an effort to avoid burdening the user to re-authenticate. When attempting to access an enterprise resource or initiating a secure connection to the enterprise resource, the mobile device may provide the ticket to the remote access point instead of reauthenticating. Nevertheless, it should be understood that over time, such tickets may expire. The expiration of a ticket may be specified by including a validity duration (e.g., a time period of validity for the ticket or a date/time when the ticket expires, etc.) within the ticket. If such tickets expire prior to use, operations that required tickets instead now require that the user re-authenticate. Additionally, tickets can be offered based on the resources that are attempted to be accessed. For example a ticket with a long validity duration could be issued when attempting to access an e-mail resource, such as an Exchange server, while a ticket with a shorter validity duration could be issued when attempting to access other resources.

A ticket may be first loaded into the mobile device during initial authentication (e.g., at step 901) or when the policy information is received (e.g., at step 903). The ticket may be linked to the same credentials that were previously used to logon and confirm entitlement. If such token/ticket has expired, then the user may be asked to proceed through the authentication process again before allowing VPN access. After authenticating to the gateway, the specialized network software constructs a VPN tunnel through the gateway device to the actual intranet resource. However unlike other system level VPN solutions, this VPN tunnel is only available for this specific application on the user's device to use.

A ticket may be usable to provide authentication in connection with creating a VPN tunnel to enterprise resources. For example, a ticket may include data or be otherwise configured to authenticate a user, mobile device or application that is attempting to create a VPN tunnel to an enterprise resource that is accessible through an access gateway. A ticket may be one-time use and/or time-based, and impose constraints and/or privileges to the application or user when accessing an enterprise resource. For example, a ticket may be specified as valid for a two-week period, or some other shorter or longer time period as the enterprise operator wishes (e.g., provide short-lived or longer-lived access). In some arrangements, access control is structured so that the level of security diminishes over time. For instance, some applications which should have high security may be provided tickets that expire more quickly (e.g., after a predefined amount of time such as an hour, 15 minutes, etc.). Other tickets associated with applications of lower security may expire at a later time (e.g., after a later predefined amount of time such as a day, etc.). Other ticket-based techniques for imposing different levels of security based on time or other measure (e.g., number of logins) are suitable for use as well.

In some arrangements, the policy for the application may specify that the application can access the enterprise resource using a ticket. Additionally, in some arrangements, the policy or the ticket itself may specify the time period for which the token is valid. The ticket may include a code or identifier that uniquely identifies the ticket, user, application or mobile device to the enterprise (or mobile device).

Referring again to step 905, determining whether the mobile device has a valid ticket can be performed in various ways. For example, the mobile device may first search for a ticket (e.g., determine whether the mobile device is storing a ticket for the application) and, if found, determine if the ticket is valid (e.g., determine whether the ticket has not expired in accordance with the time-period associated with the ticket). In some arrangements, the mobile device may determine whether the policy includes a ticket or otherwise indicates that the application's access to the enterprise resource is based on a ticket. The mobile device may search a secure container for a ticket. Upon finding a ticket, the ticket, and other information related to the ticket, may be analyzed to determine whether the ticket is valid.

In some arrangements, the ticket may include a timestamp indicating a status for the ticket (e.g., a timestamp of "12:00 on Jan. 1, 2012" indicating the initial time for the ticket; or a number of accesses indicating the number of times the enterprise resources has been accessed using the ticket). Additionally, the ticket or the policy for the application may include an indication describing a condition as to when the ticket expires (e.g., a time-period such as two-weeks, one day, forever, etc.; a number of accesses to the enterprise resource such as one access, ten accesses, infinite accesses, etc.). Based on the status and the indication, the mobile device may determine whether the ticket has expired. If the ticket has expired, the mobile device has a ticket that is not valid. Otherwise, the ticket has not expired and the mobile device has a ticket that is valid.

In some instances, the mobile device may not find a ticket stored at the mobile device. In such instances, it may be determined that the mobile device does not have a ticket that is valid.

Upon determining that the mobile device has a ticket that is valid, the method may proceed to step 909. Otherwise, the mobile device has a ticket that is not valid and the method may proceed to step 907.

At step 907, the mobile device may re-authenticate (e.g., in a manner similar to step 901) and may obtain a new ticket. In some arrangements, the policy information may also be updated. Subsequently, the method proceeds to step 905 to validate the new ticket.

At step 909, the mobile device may analyze the policy information for compliance with any condition or rule related to the application accessing the enterprise resource. For example, the current policy information may be checked to determine if network access should be permitted. Assuming the mobile device is running on a foreign network and the enterprise administrator has permitted VPN access for this application for this user, then a secure connection may be initiated to the enterprise gateway device.

If policy information dictates no network access, then the mobile device may fail to connect to the enterprise. If the network access policy permits network usage but does not permit VPN access, then network service calls are routed directly to the mobile device platform network services though the local network that the device is attached to rather than being tunneled back to the corporate intranet. Additional network policies can further constrain the range of corporate intranet servers that are accessible by IP address, domain or host names, port/protocol, Transmission Control Protocol (TCP)/User Datagram Protocol (UDP), etc.

At step 911, the mobile device may transmit the ticket to the enterprise. The enterprise may perform its own validation on the ticket. The enterprise may transmit an acknowledgement of receipt or result of its validation to the mobile device and, in such arrangements, the mobile device may proceed to step 913 upon receiving the communication from the enterprise.

At step 913, the mobile device may create a per-application policy-controlled VPN tunnel to the enterprise resource, such as a MicroVPN tunnel similar to those illustrated in FIG. 5. This tunnel may be created with the enterprise gateway device. Subsequently, the mobile device may proceed to access the enterprise resource via the per-application policy-controlled VPN tunnel. For example, the user may, if the application is a mail client, access e-mail related services and the like. Upon successful creation of the tunnel, the mobile device may, in some arrangements, update the ticket (e.g., increment the number of logins if the status describes a number of logins).

In view of steps 905-913, a mobile device may, based on the ticket, receive access to an enterprise resource without separate authentication. For example, the ticket can be used to access the enterprise resource until it expires despite the VPN tunnel timing out or otherwise losing the VPN connection to the enterprise resource. Indeed, assuming the ticket stays valid, if the user closes the VPN tunnel and at a later time decides to access the enterprise resource again (e.g., see if any new e-mail has been received), steps 905, 909, 911 and 913 may be repeated with the ticket to access the enterprise resource without repeating step 901 or 909. In some arrangements, such a process of regaining access to the enterprise resource by reusing the ticket may occur without knowledge of the user (e.g., performed in the background or without any indication being provided to the user as to the process of recreating the VPN tunnel). Such a process can provide a seamless experience to the user.

In addition to being used to provide access to an enterprise resource without separate authentication of the application, user or mobile device, a valid ticket may be used in other ways. For example, some applications may provide presence-related functionality, such as an indication of whether a user is idle or online. The application may, based on the ticket, provide one or more servers of the enterprise with information required to enable the presence-related functionality. Indeed, the application may provide the ticket to a server (e.g., a server accessible through the access gateway, or otherwise provided by the enterprise). The server may be able to determine the user that the ticket is related to and set the status of the user as online or not idle.

The above-provided description may discuss particular operations of the applications figuratively (e.g., as the applications performing the operations). However, it is actually the processing circuitry of the mobile device that may perform operations while executing the applications.

As described above, when a mobile computing device accesses an enterprise computer/IT system, sensitive information or data associated with the enterprise and/or enterprise-related software applications can become stored onto the mobile device. Enterprise-related data can comprise any data associated with the enterprise, such as, without limitation, product information, sales data, customer lists, business performance data, proprietary know-how, new innovation and research, trade secrets, and the like. Because this information can be very sensitive, an enterprise may wish to safeguard such information.

Further, enterprises may wish to regulate how users use their mobile devices. For example, enterprises may want some control over where the mobile devices are used, which mobile device features can be used, which software applications can be installed and/or run on the devices, and the like. Enterprises also have a need to control and implement remedial actions for users that violate their mobile device usage policies.

When users in the field experience problems with their mobile devices or could benefit from information, data, software, or coaching on how to perform certain operations using the devices, it can be difficult for the enterprise's IT support to provide highly effective assistance. Accordingly, there is a need for improved secure management and technical support of mobile devices associated with an enterprise. Management of any device, application, or accessible tool is sometimes referred to as MDM or MRM. Enterprises may manage devices, applications, software, settings, features, remote tools, virtualized apps, etc.

Embodiments described herein address these and other concerns. The present application discloses computer systems and methods for automated or semi-automated management of mobile computing devices that access an enterprise computer network, such as access to computer-implemented resources of the enterprise.

More particularly, as described above (e.g., in connection with FIG. 5 and FIG. 9, etc.), a mobile device (e.g., mobile device 502) can communicate with enterprise resources (resources 504) via an access gateway (access gateway 560) and, for example, a microVPN tunnel. Further, the enterprise can use the tunnel to send information back to the mobile device, such as data responsive to an access request.

When a user executes a managed application on the mobile device, the user is typically challenged to authenticate the user's identity along with passwords and other factors as dictated by corporate rules. After authentication, the mobile device may be provided with a policy for determining how the managed application is to perform network accesses. By basing one or more policies on enrollment in MRM, a policy can be based on information not otherwise known to the mobile device, but which is known through the MRM service.

For example, when enrolled in MRM, the enterprise (e.g., access gateway or a MRM server) may store information regarding whether or not a mobile device has a device level PIN enabled, device level encryption, security certificate information, and any other information that the enterprise has access to through enterprise level management of the mobile device. Thus, a policy, in one embodiment, may specify a policy decision on whether or not the mobile device has a device level PIN enabled. In another example, policy may set a policy decision based on whether or not the mobile device has device level encryption enabled. In another example, the policy may set a policy decision based on whether or not the mobile device has been provisioned with a required certificate to access a particular enterprise resource. For example, an internal enterprise web site might require that the device be provisioned with a certificate from the enterprise. In addition, the converse may also occur. For example, the enterprise may grant a certificate to a mobile device when applicable policy information allows the device (or application) to access a particular resource that requires a certificate administered by the enterprise.

Figure 10:
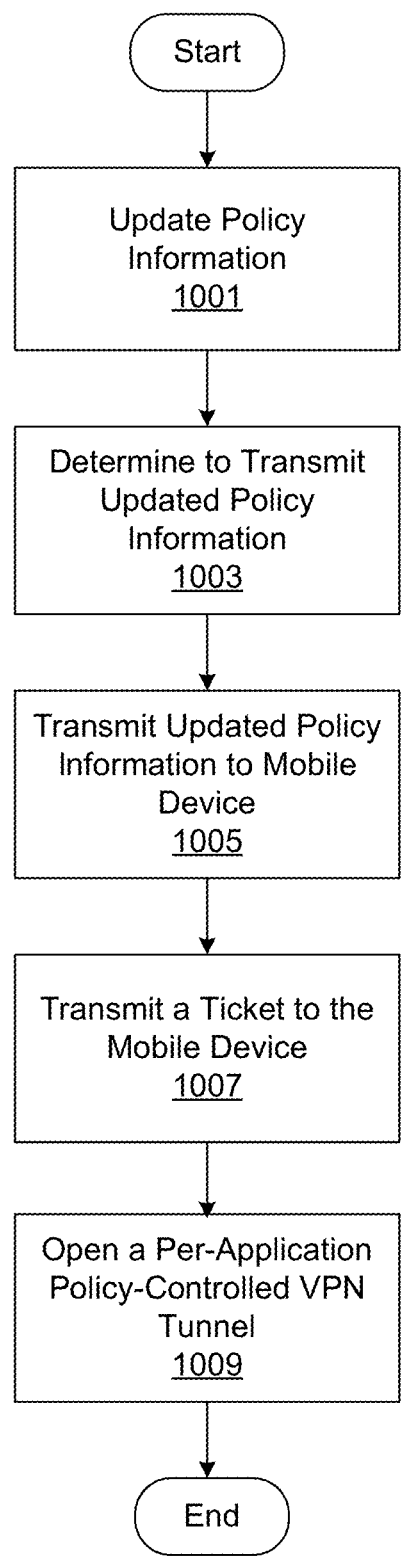
FIG. 10 illustrates a method of providing managed applications with per-application policies for accessing enterprise resources in accordance with one or more illustrative aspects discussed herein.

FIG. 10 illustrates a method of providing managed applications with per-application policies for accessing enterprise resources. In one or more embodiments, the example method of FIG. 10 may be performed by the processing circuitry of an access gateway when operating in accordance with various software constructs stored in the memory of the access gateway.

At step 1001, an access gateway (or MRM server) may update policy information. The policy information may be related to or be for a particular application installed a particular user's mobile device. In one or more arrangements, the access gateway may update policy information based on information that is stored by, maintained by, and/or accessible to the access gateway, such as a listing of applications that are installed on the mobile device and/or a listing of tickets that are issued and currently valid for the mobile device. In some instances (and as more fully discussed below), such information may be created, accessed, modified, and/or stored by the access gateway based on input and/or other information received from an administrative user of the enterprise network (e.g., an administrative user may input a listing of managed applications installed on the mobile device).

Additionally, such information may be created, accessed, modified, and/or stored by the access gateway based on network traffic to/from the mobile device and the enterprise network (e.g., the access gateway may update a list of tickets whenever a ticket is transmitted or issued to the mobile device in connection with providing access to enterprise resources on the basis of a per-application policy-controlled VPN tunnel, as described in connection with FIG. 9). The listing of tickets or listing of applications may also be associated with information identifying the user of the mobile device and/or any credentials used to authenticate the user.

Furthermore, such information may be created, accessed, modified and/or stored by the access gateway based on one or more risk determinations. For example, the access gateway may determine a risk score according to one or more risk-based authentication rules. If the risk score is above or below a particular threshold, the access gateway may create/access/modify/store policy information that requires a managed application or managed device to perform particular authentication processes. In some arrangements, if the risk score is above the threshold, the access gateway may require a more secure authentication process before allowing access to a resource or allowing creation of an application-specific VPN tunnel. If the risk score is below the threshold, the access gateway may require a less secure authentication process before allowing access to a resource or allowing creation of an application-specific VPN tunnel. Among the many different types of authentication processes the access gateway may require based on the risk score are, for example, multi-factor schemes, single factor schemes, biometric schemes, passcode schemes, risk-based authentication schemes, and the like.

At step 1003, an access gateway may determine to transmit an update to the policy information. In some embodiments, the determination to update policy information may be based on receiving a request for policy information from a mobile device or from a mobile device attempting to create a microVPN tunnel. In some embodiments, this determination to update policy information may be based on information received from another enterprise entity (e.g., an enterprise operator sends a signal to the access gateway to update policy information) or based on a determination to update policy information performed by the access gateway (e.g., if access gateway is configured to periodically update policy information).

At step 1005, the access gateway may transmit the updated policy information to the mobile device. Upon receipt, the mobile device may store the policy information in an appropriate location (e.g., a secure container) and may implement the policies specified in the information.

At step 1007, the access gateway may transmit a ticket to the mobile device. Based on transmitting the ticket, the access gateway may update the listing of applications or tickets. For example, the access gateway may update the listing of tickets to add the ticket and, in some arrangements, other information related to the ticket (e.g., an identification of the application the ticket is issued to) to the listing; or update the listing of tickets to update an entry already present on the listing. As another example, the access gateway may update the listing of applications with an identification of the application that the ticket was issued to.

While steps 1005 and 1007 are illustrated as separate steps, they may be combined into a single step in some arrangements. For example, if the ticket is included in the policy information, the ticket would be transmitted when transmitting the updated policy information.

At step 1009, the access gateway may open a per-application policy-controlled VPN tunnel for an application that is requesting access to an enterprise resource. Opening of the tunnel may be initiated responsive to one or more requests made by the mobile device. In connection with or when requesting a per-application policy-controlled VPN tunnel, a mobile device may transmit a copy of a ticket to the access gateway and/or an identification of the application that is requesting the enterprise resource. The access gateway may compare the copy of the ticket to the listing of tickets and, if the ticket is present on the listing, reply with an acknowledgement or an indication that the ticket has been validated by the access gateway.

In some embodiments, the steps of FIG. 10 may be performed based on input received via a user interface that is accessible to an operator of the enterprise. For example, an information technology technician employed by the enterprise may view a user interface in order to create, access, modify and/or store policy information at the access gateway (e.g., step 1001 of FIG. 10), cause the access gateway to send an update to the policy information (e.g., step 1003 of FIG. 10), or cause the access gateway to send a ticket (e.g., step 1007 of FIG. 10), etc. For example, the technician may view the listing of application or listing of tickets via the user interface, modify the listing via the user interface, create a ticket to be sent to a mobile device via the user interface, and cause the access gateway to store and/or send the ticket to the mobile device via the user interface.

The architecture described in this specification can be used by a corporation or other enterprise to flexibly implement a policy, such as a corporate owned device, BYOD (bring your own device) policy, for allowing enterprise users to use their mobile devices to securely access enterprise resources (documents, confidential data, corporate application and database servers, etc.). This is accomplished through various security features that, for example, enable the enterprise to specify and implement policies for controlling mobile device accesses to particular enterprise resources. The policies may, for example, control mobile device accesses to enterprise resources based on a variety of criteria, such as the role of the respective user (e.g., which department the user is in), the configuration of the mobile device (e.g., whether any blacklisted mobile applications are installed), the logged behaviors of the user, the location of the mobile device, and/or the time at which access to the enterprise resource is requested. The architecture further enhances security, in some embodiments, by creating application tunnels that enable enterprise mobile applications to securely communicate over a network with the enterprise system. The architecture may also enable IT staff to selectively (and remotely) wipe a user's mobile device of enterprise application(s) and corporate data when, for example, the user discontinues employment or violates a corporate policy (such as if they jailbreak their device or otherwise use it in a disallowed configuration).

The use of passcodes (or other types of authentication information) for enterprise applications reduces the likelihood that enterprise resources will be improperly accessed when, for example, the mobile device is lost or stolen, or when the mobile device is used by an employee's children to play games. In some embodiments, the secure launcher (or another component installed on the mobile device) further reduces this risk by performing a selective wipe of the mobile device when, for example, the user attempts but fails to enter a valid passcode a threshold number of consecutive times (e.g., 5 or 10). The selective wipe operation deletes some or all of the enterprise applications and associated data from the mobile device, without deleting any personal applications or data. In some embodiments, the enterprise's IT department can initiate a selective wipe of a particular mobile device by remotely issuing a wipe command to the device.

Figure 11:
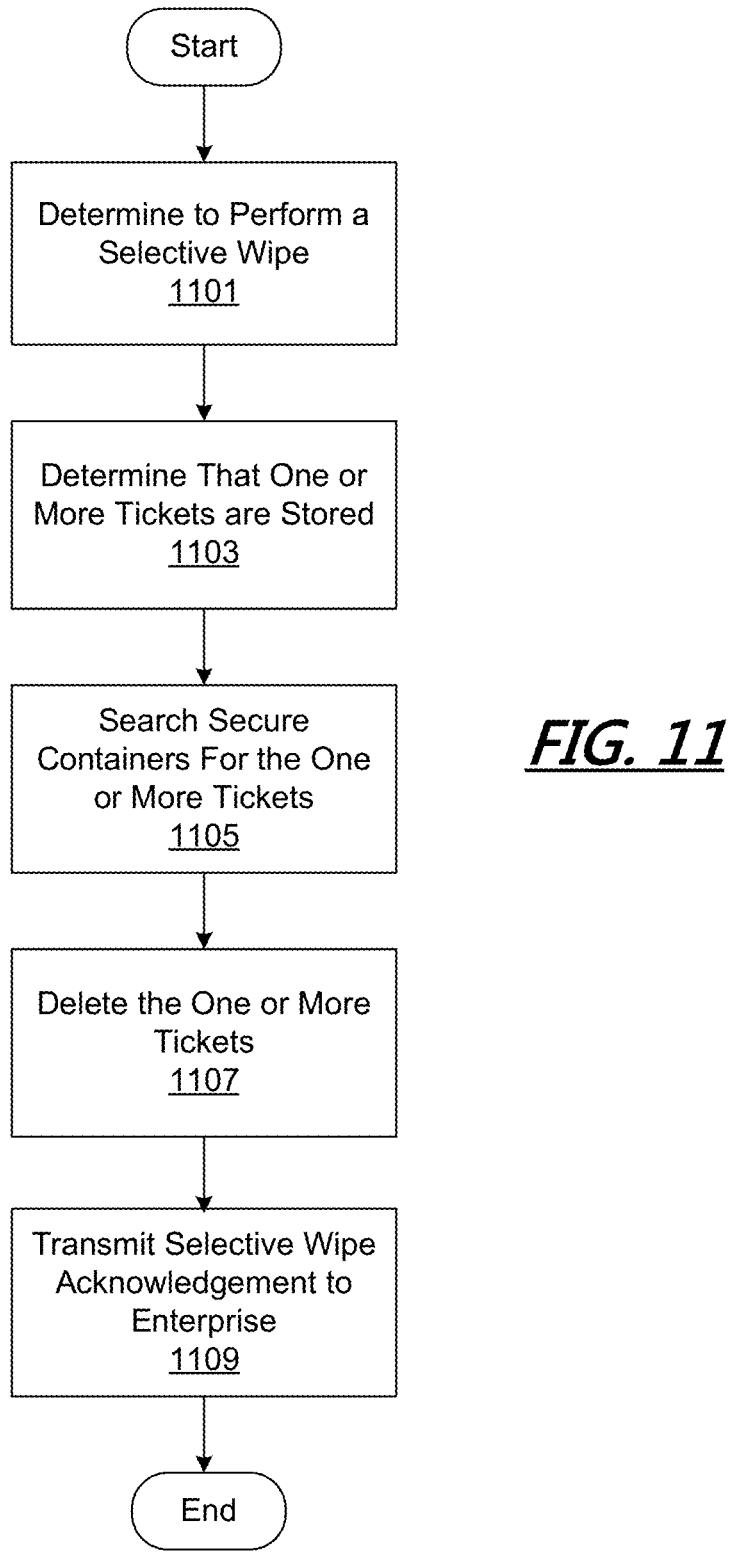
FIG. 11 illustrates a method of providing a selective wipe of data related to providing per-application policy-controlled VPN tunnels according to various aspects described herein.

In some embodiments, when a selective wipe operation is performed, some or all of the documents and data stored in the secure container are deleted from the mobile device or are otherwise made inaccessible. FIG. 11 illustrates a method of providing a selective wipe of data related to providing per-application policy-controlled VPN tunnels. In one or more embodiments, the example method of FIG. 11 may be performed by the processing circuitry of a mobile device when operating in accordance with various software constructs stored in the memory of the mobile device.

At step 1101, a mobile device may determine to perform a selective wipe. The determination may be received from various sources. For example, the enterprise may send an instruction to perform the selective wipe or the mobile device may analyze its status to determine whether to perform a selective wipe. A user may uninstall an application, and the mobile device may determine to perform a selective wipe of data associated with managing the application. An application may switch from a managed mode to an unmanaged mode, and the mobile device may determine to perform a selective wipe of data that an unmanaged application should not have access to. Other conditions where a selective wipe may be determine include determining to perform a selective wipe based on a determination that the mobile device is jailbroken or rooted, is installed with a blacklisted application, is not configured with a lock screen, and the like.

Steps 1103-1109 form part of a process for performing the selective wipe. Other data may be deleted from the mobile device during the selective wipe process. The below steps are related to identifying and deleting tickets from secure containers as part of a selective wipe process that deletes or otherwise makes inaccessible enterprise data associated with the managed application, which may include the policy information.

At step 1103, the mobile device may determine that one or more tickets are stored in one or more secure containers on the mobile device. In some arrangements, this may include analyzing policy information to check for the inclusion of ticket-related information such as, for example, an identification of a ticket, a location where a ticket is stored, or other identifier of a secure container where a ticket is stored. In some arrangements where the selective wipe is directed at wiping the enterprise data associated with a particular application, the policy for the particular application may be analyzed. In some embodiments, the tickets may have been issued in connection with providing one or more applications access to one or more enterprise resources (see e.g., FIG. 9).

At step 1105, the mobile device may search one or more secure containers for the one or more tickets. In some arrangements, the searching for the one or more tickets may be based on the information found in a policy that was analyzed at step 1103. For example, if a policy analyzed at step 1103 was found to include a particular identification of a ticket, the mobile device may perform the search based on the particular identification of the ticket. If a policy analyzed at step 1103 was found to include a particular location of where a ticket was stored, the mobile device may perform the search based on the particular location.

At step 1107, the mobile device may delete or otherwise make inaccessible the one or more tickets.

At step 1109, the mobile device may transmit a selective wipe acknowledgement to the enterprise. Such an acknowledgement may provide an indication to the enterprise that the selective wipe was successful. The acknowledgement may include a listing of applications and/or listing of tickets that were affected/deleted by the selective wipe. Upon receipt, the enterprise (e.g., access gateway) may update its stored records accordingly. For example, an access gateway may receive a selective wipe acknowledgment that includes a listing of application and/or listing of tickets that were affected/deleted by the selective wipe and, respectively, may update its listing of applications installed on the mobile device by removing entries corresponding to the application(s) indicated by the acknowledgement and/or update its listing of tickets issued and valid to the mobile device by removing entries corresponding to the tickets indicated by the acknowledgement.

Managed applications are typically allowed to exchange data with other managed applications, but may be constrained or blocked from exchanging data with other applications, such as the user's own personal applications. In some examples, application policies of managed applications are configured to allow links and/or icons presented in one managed application to be followed or opened in another application only if the other application is also a managed application.

For example, a managed email application can be configured, through its policy, to allow an attachment to be opened in a managed PDF annotator. But the same managed email application can be configured to prevent the same attachment from being opened in a PDF annotator that is not part of the managed set.

By constraining managed applications to interact on a mobile device through enterprise-administered policies, the managed set of applications can thus be made to operate with other applications in the managed set of applications, but can be prevented from operating with applications that are not part of the managed set.

An application may be run on the mobile device in one of a plurality of operations modes. The operation modes may comprise, for example, managed and unmanaged modes. There may be multiple different managed modes, e.g., based on different security levels of various users or sets of credentials provided by a user, different user roles identified by a set of credentials (e.g., manager versus staff employees), geographic locations from which the device is operated, network locations, operational environment (e.g., a healthcare-related managed mode versus a financial industry managed mode), or based on any other contextual determination.

In an embodiment, the policies may be stored remotely, such as at policy manager 570, described above with reference to FIG. 5, or may be stored locally on the device. In an example, a selected application configured to access a secure account, such as an email application configured to access a secure email account, may be executed in an operation mode based on the policy. For instance, the stored policy may define that an email application that is configured to access a secure email account is to be run as a managed application. The stored policy may further indicate that the email application, when configured to access a personal account of the device user, may operate in an unmanaged mode.

In an embodiment, an application running in managed mode may access data stored in a secure data container 528 in the managed partition 510 (physical, logical, or virtual) of the mobile device. The data stored in the secure data container 528 may include data restricted to a specific secure/managed application 530, shared among other secure/managed applications, and the like. Data restricted to a secure application may include secure general data 534 and highly secure data 538. Different levels and types of security features may be used to differentiate levels of secure data. In an embodiment, an application running in managed mode may save, modify, or delete data in secure data container 528. The data saved or modified may be encrypted similar to other data stored in secure data container 528.

In an embodiment, an application running in managed mode may connect to enterprise resources 504 and enterprise services 508 through virtual private network connections, as described about with reference to FIG. 5. The virtual private network connections may be microVPNs, which are specific to a particular application, such as the selected application, particular devices, particular secured areas on the mobile device, and the like. For example, wrapped applications in a secured area of the phone may access enterprise resources through an application specific VPN such that access to the VPN would be granted based on attributes associated with the application, possibly in conjunction with user or device attribute information, and policy information.

In an embodiment, an application running in managed mode may encrypt data transmitted from the application. For example, an application running in managed mode may be communicating with a computing device over a network, and the data transmitted from the application to the device may be encrypted. In addition, the data communicated from the computing device to the application may also be encrypted, and the application running in managed mode may be configured to decrypt the received data.

In an embodiment, an application running in managed mode may access enterprise resources via a secure connection. For example, an application may connect over a network, for example, using a microVPN, and may access a secure portal that might not be accessible by unsecured applications, such as applications running in unmanaged mode.

In an embodiment, an unmanaged operation mode may include running the application as a part of the unmanaged partition 512 (physical, logical, or virtual) of mobile device 502, as described above with reference to FIG. 5. In an unmanaged mode, the application may access data stored in an unsecured data container 542 on the unmanaged partition 512 of the mobile device 502. The data stored in an unsecured data container may be personal data 544.

In an embodiment, where more than one managed mode is possible, an application running in a less secure managed mode may be run similar to an application running in the more secure managed mode, but might not include all aspects of the latter. For example, an application running in the less secure managed mode may have the information transmitted from the application over a network encrypted, but the application might not have access to secure data container 528, as described with reference to FIG. 5. In another example, an application running in the less secure managed mode may have access to secure data container 528, but might not be able to connect to enterprise resources 504 and enterprise services 508 through virtual private network connections. Accordingly, depending on the determined context, an application running in a less secure managed mode may include aspects of an application running in the more secure managed mode and aspects of an application running in unmanaged mode. In an embodiment, an application running in a less secure managed mode may be run similar to an application running in managed mode, but might not include all aspects of the latter. For example, an application running in a less secure managed mode may have the information transmitted from the application over a network encrypted, but the application might not have access to secure data containers, as described with reference to FIG. 5. In another example, an application running in a less secure managed mode may have access to secure data containers, but might not be able to connect to enterprise resources and enterprise services through virtual private network connections. Accordingly, depending on the determined context, an application running in a less secure managed mode may include aspects of an application running in managed mode and aspects of an application running in unmanaged mode.

The operation mode of the application may be set based on various criteria. For example, as discussed above in connection with FIG. 5, a dual mode option (e.g., item 540 of FIG. 5) may present the user with an option to operate the managed application in an unsecured or unmanaged mode. In addition to the dual option mode being settable by a user, the option may be directed by the policy of the application. For example, the policy may include a policy decision indicating which mode the application is to be operated in. The policy could place additional conditions on the operation mode, such as by selecting a managed or unmanaged mode based on a current location of the mobile device or based on what type of network the user is attempting to gain access from (e.g., WiFi, a user's home network, etc.). Such conditions could be referred to as contexts. These and other aspects will be further explained in connection with FIGS. 12A-12G. In one or more embodiments, the example methods of FIGS. 12A-12G may be performed by the processing circuitry of a mobile device when operating in accordance with various software constructs stored in the memory of the mobile device. However various aspects, in some variations, may be performed by an enterprise device, such as device manager 524 of FIG. 5.

In FIGS. 12A-12F, flowcharts of example method steps for determining a context and operation mode for an application are shown.

Figure 12A:
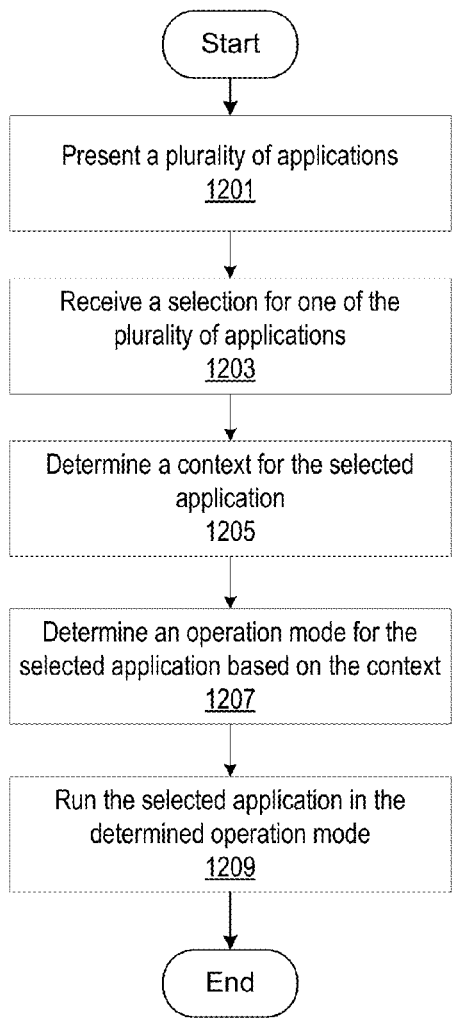
FIGS. 12A-12F illustrate example methods of determining a context and operation mode for an application according to one or more aspects described herein.

In FIG. 12A, a flowchart of example method steps for determining an application mode for an application is shown. The method of FIG. 12A may begin at step 1201, where a plurality of applications are presented. A plurality of applications may be presented to a user on a mobile device. The method of FIG. 12A may proceed from step 1201 to step 1203, where a selection for one of the plurality of applications is received. A user of a mobile device may select one of the presented applications by, for example, pressing a display of the mobile device to select the application. This is merely an example, and the application may be selected in any suitable manner.

The method of FIG. 12A may proceed from step 1203 to step 1205, where a context for the selected application is determined based on one or more operational parameters of the device executing the selected application. For example, a context may be based on an account to be accessed by the application, a location of the mobile device or a network connectivity status of the mobile device executing the application, or based on any other operational parameter. The methods of FIGS. 12B-12E, further described below, illustrate various embodiments where example contexts are described.

The method of FIG. 12A may proceed from step 1205 to step 1207, where an operation mode for the selected application is determined based on the context. The operation mode may be determined based on one or more determined contexts.

In an embodiment, the determined context may be compared to a stored policy in order to determine an operation mode. A mobile device may store one or more policies used to determine an operation mode for an application. In an example, a context may comprise a selected application configured to access a secure account, such as an email application configured to access a secure email account. This context may be compared to one or more of the stored policies. For instance, a policy may define that an email application that is configured to access a secure email account is to be run as a managed application. Additional contexts and policies will be described with respect to FIGS. 12B-12E.

The method of FIG. 12A may proceed from step 1207 to step 1209, where the selected application is run in the determined operation mode. For example, the operation mode may be determined as managed, unmanaged, or one of the multiple modes that are available, and the selected application may be run in the determined mode.

In an embodiment, an application that is capable of running in managed mode, unmanaged mode, or a less secure managed mode may be controlled by partition, by policy, by one or more sandboxes, or any other suitable configuration. In an embodiment, a managed operation mode may include running the application as a part of the managed partition 510 of mobile device 502 as discussed above in connection with FIG. 5. In an embodiment, an application running in managed mode may access data stored in a secure data container 528 in the managed partition 510 of the mobile device. The data stored in the secure data container 528 may include data restricted to a specific secure application 530, shared among other secure applications, and the like. Data restricted to a secure application may include secure general data 534 and highly secured data 538. Secure general data may use a strong form of encryption such as AES 128-bit encryption or the like, while highly secure data 538 may use a very strong form of encryption such as AES 256-bit encryption. Other types of encryption may be used, and other levels and types of security measures may be applied based on a desired level and/or type of security, as well as different key recovery features. In an embodiment, an application running in managed mode may save, modify or delete data in secure data container 528. The data saved or modified may be encrypted similar to other data stored in secure data container 528. In this example, an unmanaged operation mode may include running the application as part of unmanaged partition 512, as described above.

In an embodiment, an application running in a more secure managed mode, unmanaged mode, or a less secure managed mode may be controlled by one or more policies. As such, one or more policies may define that the application running in managed mode may access secured data (e.g., data in secure data container 528, encrypted data, such as data encrypted with a particular key, or any other suitable secured data), may communicate with a secure server (e.g., gateway server 560), may be managed by a device manager (e.g., device manager 524), or any other suitable policy. One or more policies may also define that the application running in an unmanaged mode may not access secure data (e.g., data in secure data container 528, encrypted data, such as data encrypted with a particular key, or any other suitable secured data), may not communicate with a secure server (e.g., gateway server 560), may access unsecured data (e.g., unsecured data container 542, unencrypted data, or any other unsecured data), or any other suitable policy. In this example, an application running in managed mode and an application running may either include partitions (e.g., managed partition 510 and unmanaged partition 512) or may not include partitions.

In an embodiment, an application running in a more secure managed mode, unmanaged mode, or a less secure managed mode may be controlled by one or more sandboxes. A sandbox may comprise a physical or virtualized portion of a device where applications running in the sandbox may include access policies for applications that are not running in the sandbox. For example, an application running in managed mode may run in a sandbox that includes policies for the managed mode, such as the policies described herein. In another example, an application running in unmanaged mode may run in a sandbox that includes policies for the unmanaged mode, such as the policies described herein. In this example, an application running in managed mode and an application running in unmanaged mode may either include partitions (e.g., managed partition 510 and unmanaged partition 512) or may not include partitions.

In an embodiment, an application running in managed mode may access data stored in a secure data container 528 in the managed partition 510 of the mobile device. The data stored in the secure data container 528 may include data restricted to a specific secure application 530, shared among other secure applications, and the like. Data restricted to a secure application may include secure general data 534 and highly secure data 538. Secure general data may use a strong form of encryption such as AES 128-bit encryption or the like, while highly secure data 538 may use a very strong form of encryption such as AES 256-bit encryption. In an embodiment, an application running in managed mode may save, modify, or delete data in secure data container 528. The data saved or modified may be encrypted similar to other data stored in secure data container 528.

In an embodiment, an application running in managed mode may connect to enterprise resources 504 and enterprise services 508 through virtual private network connections, as described about with reference to FIG. 3. The virtual private network connections may be specific to a particular application (e.g., a per-application policy-controlled VPN tunnel, such as MicroVPN), such as the selected application, particular devices, particular secured areas on the mobile device, and the like. For example, wrapped applications in a secured area of the phone may access enterprise resources through an application specific VPN such that access to the VPN would be granted based on attributes associated with the application, possibly in conjunction with user or device attribute information.

In an embodiment, an application running in managed mode may encrypt data transmitted from the application. For example, an application running in managed mode may be communicating with a computing device over a network, and the data transmitted from the application to the device may be encrypted. In addition, the data communicated from the computing device to the application may also be encrypted, and the application running in managed mode may be configured to decrypt the received data.

In some variations, the managed application may be run as secure native applications 514, secure remote applications 522 executed by a secure application launcher 518, virtualization applications 526 executed by a secure application launcher 518, and the like. The applications may be a stabilized application such that the device monitor 524 monitors the stabilized applications to detect and remedy problems that might result in a destabilized application, such as pushing updates to the stabilized applications. The data saved or modified may be encrypted similar to other data stored in secure data container 528. In some arrangements, an unmanaged operation mode may include running the application as part of unmanaged partition 512, as described above.

In an embodiment, step 1205 to 1209 of FIG. 12A may comprise the method steps of any one or more of FIGS. 12B-12F. The method of FIG. 12B may begin at step 1211, where an account to be accessed by a selected application is detected. For example, a selected application may comprise an email application and an email account that the email application is configured to access may be detected. In this example, the email application may be able to access multiple email accounts, such as an enterprise email account and a personal email account, and the account that the email application is configured to access at the time of running may be determined as the context account to be accessed.

Figure 12B:
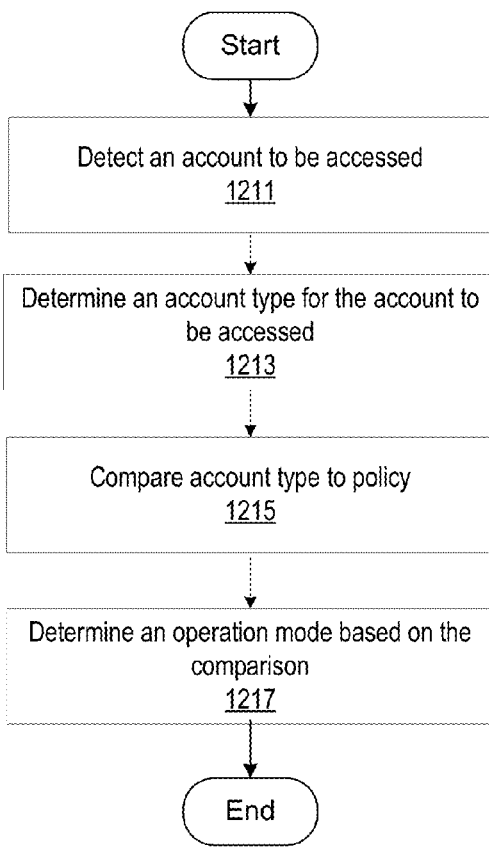

The method of FIG. 12B may proceed from step 1211 to step 1213, where an account type of the account to be accessed may be determined. The account type may comprise a context for the selected application. For example, a selected application may comprise an email application and the email application may be configured to access an enterprise account. In another example, the email application may be configured to access a personal account.

The method of FIG. 12B may proceed from step 1213 to step 1215, where an account type may be compared with a policy. For example, a policy may define that an email application that is to access an enterprise account should run in managed mode and an email application that is to access a personal account should run in unmanaged mode. The method of FIG. 12B may proceed from step 1215 to step 1217, where an operation mode is determined based on the comparison.

Figure 12C:
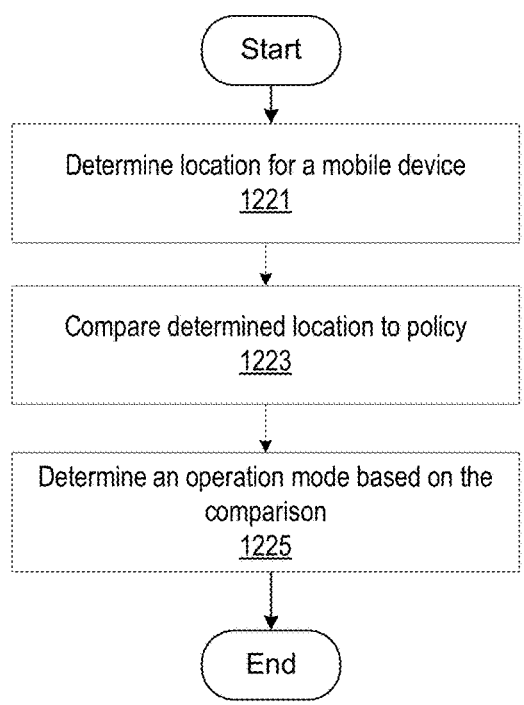

The method of FIG. 12C may begin at step 1221, where a location for a mobile device is determined. For example, a mobile device, such as mobile device 502, may implement the method of FIG. 12C, and a location for the mobile device may be determined. The location may be determined by GPS, signal triangulation, or any other suitable or otherwise known manner. The location may comprise a context for the selected application.

The method of FIG. 12C may proceed from step 1221 to step 1223, where a determined location may be compared with a policy. For example, a policy may define that a selected application run in a more secure managed mode when in a certain location, for example, on company premises. In an embodiment, a policy may define that a selected application run in a less secure managed mode when in a certain location, for example, when the determined location is inside the United States but off company premises. For example, the less secure managed mode may encrypt communication to and from the selected application, but might not allow access to enterprise resources, such as resources 504. In another embodiment, a policy may define that a selected application run in unmanaged mode when in a certain location, for example, when the determined location is outside the United States. The method of FIG. 12C may proceed from step 1223 to step 1225, where an operation mode is determined based on the comparison.

Alternatively or in addition to physical location, a network location may also or instead be used to determine whether access is permitted. For example, network location may refer to whether a user is either internal to a data center (or pre-approved Wifi access point), or is external to it. Appropriate access modes may be based on such a determination.

Figure 12D:
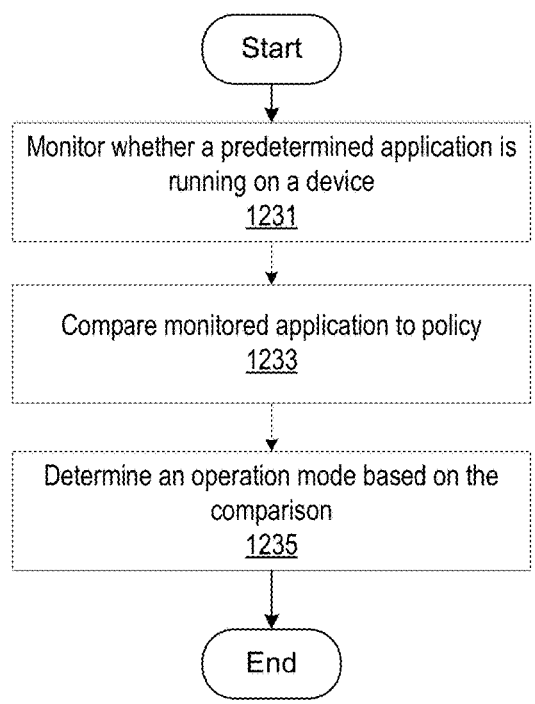

The method of FIG. 12D may begin at step 1231, where it is monitored whether a predetermined application is running on a device. For example, a mobile device, such as mobile device 502, may implement the method of FIG. 12D, and the mobile device may be monitored to determine whether a predetermined application is running. The predetermined application may comprise any application capable of running on the mobile device. The monitored predetermined application may comprise a context for the selected application.

The method of FIG. 12D may proceed from step 1231 to step 1233, where a monitored application is compared against a policy. For example, a policy may define that a selected application run in managed mode when a predetermined application is running and that the selected application run in unmanaged mode when the predetermined application is not running. Additionally, a policy may define that a selected application run in managed mode whenever a ticket used to authenticate a user when establishing a per-application policy-controlled VPN tunnel (as described above in connection with FIG. 9) is received by the mobile device, or when such a ticket is valid and is stored in a secure container of the mobile device. A policy may also define that a selected application run in unmanaged mode whenever a ticket is found to be not valid or to have expired. The method of FIG. 12D may proceed from step 1233 to step 1235, where an operation mode is determined based on the comparison.

Figure 12E:
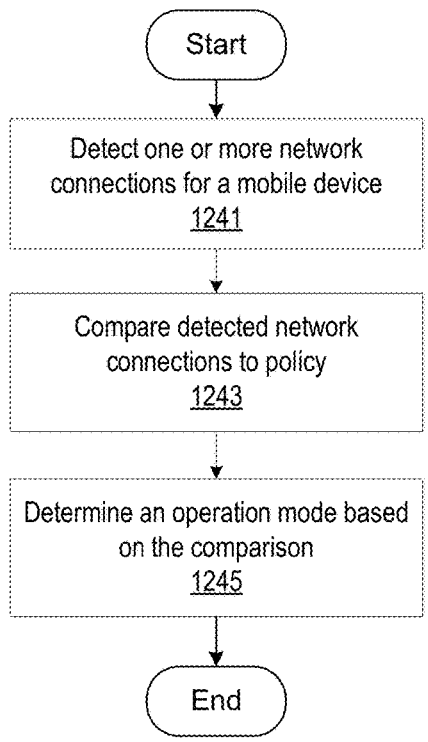

The method of FIG. 12E may begin at step 1241, one or more network connections are detected. For example, a mobile device, such as mobile device 502, may implement the method of FIG. 12E, and the network connections that the mobile device makes may be detected. In an example, network connections may comprise a connection to a cellular network, a connection to a WIFI network, or a connection to a Wireless Local Area Network (WLAN), or the like. The one or more network connections may comprise a context for the selected application.

The method of FIG. 12E may proceed from step 1241 to step 1243, where detected network connections are compared against a policy. For example, a policy may define that a selected application run in managed mode when a mobile device is connected to an internal network, such as a WLAN internal to a company, and that the selected application run in unmanaged mode when the mobile device is only connected to a wireless network, such as cellular network or WIFI network. The method of FIG. 12E may proceed from step 1243 to step 1245, where an operation mode is determined based on the comparison.

Figure 12F:
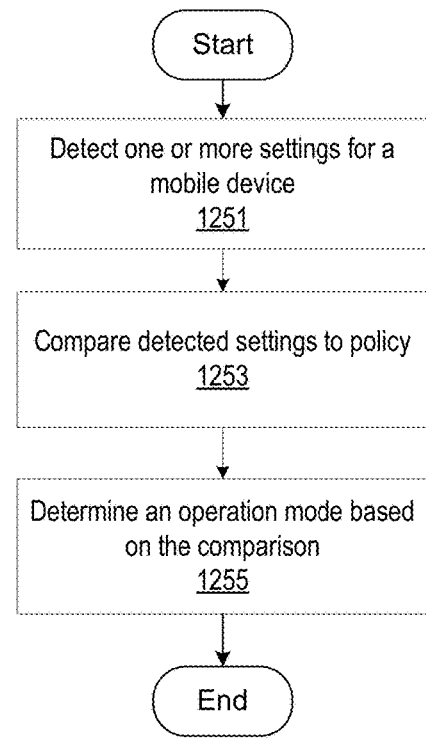

The method of FIG. 12F may begin at step 1251, where one or more settings for a mobile device are detected. For example, a mobile device, such as mobile device 502, may implement the method of FIG. 12F, and one or more settings for the mobile device may be detected. In an example, it may be detected whether the mobile device has a lock screen, such as a PIN required for using the mobile device, or it may be detected whether the mobile device is jailbroken or rooted, e.g., has received after-market modifications. The one or more settings may comprise a context for the selected application.

The method of FIG. 12F may proceed from step 1251 to step 1253, where detected settings are compared against a policy. For example, a policy may define that a selected application might not run in managed mode if the mobile device does not have a lock screen or if the mobile device is jailbroken or rooted. The method of FIG. 12F may proceed from step 1253 to step 1255, where an operation mode is determined based on the comparison. In an embodiment, when running the selected application in the determined mode, an indicator may be displayed on the mobile device that informs a user of certain policies, such as a requirement for a mobile device to have a lock screen before the mobile device is allowed to run the selected application in managed mode. FIGS. 12B-12F describe a plurality of contexts, and any other suitable context and corresponding policy may be implemented.

In an embodiment, one or more of the contexts described in FIGS. 12B-12F may be combined and these contexts may be compared against a policy for the selected application. For example, contexts for a selected application may comprise an account type to be accessed as an enterprise email account and a detected network connection as a cellular network. In this example, the policy may define that when an enterprise account is attempted to be accessed over a cellular network, the selected application should be run in managed mode. The policy may be defined in this way because the selected application may encrypt the communication with the enterprise email account, and therefore the risk of sending secure traffic over a cellular network may be mitigated.

In another example, contexts for a selected application may comprise a determined location outside of the United States and a network connection with a WLAN internal to a company. A policy may define that a selected application is to run in managed mode when a determined location is outside the United States and a network connection is with a WLAN internal to a company. The policy may be defined in this way because a network connection with a WLAN internal to a company mitigates the risk associated with secure communications outside of the United States.

In an embodiment, the one or more contexts as described in FIGS. 12B-12F may include a priority. For example, a context for a selected application may comprise a mobile device setting as jailbroken (or rooted) and a policy may define that a selected application is to run in unmanaged mode when a context indicates a jailbroken mobile device (or rooted mobile device), regardless of what other contexts indicate. Accordingly, a jailbroken mobile device (or rooted mobile device) will have a selected application run in unmanaged mode even when the mobile device is connected to a WLAN internal to a company or if the selected application is attempting to access an enterprise account.

In an embodiment, a policy may indicate that a selected application is to be run in a less secure managed mode based on a plurality of contexts as described in FIGS. 12B-12F. For example, contexts for a selected application may comprise an account type to be accessed as an enterprise email account and a detected network connection as a cellular network. In this example, the policy may define that when an enterprise account is attempted to be accessed over a cellular network, the selected application should be run in a less secure managed mode. The less secure managed mode may encrypt communication to and from the selected application, but might not allow access to enterprise resources, such as resources 504. The policy may be defined in this way because the encrypted communication with the enterprise email account may be a low risk communication, and allowing access to enterprise resources may be a high risk communication.

Figure 12G:
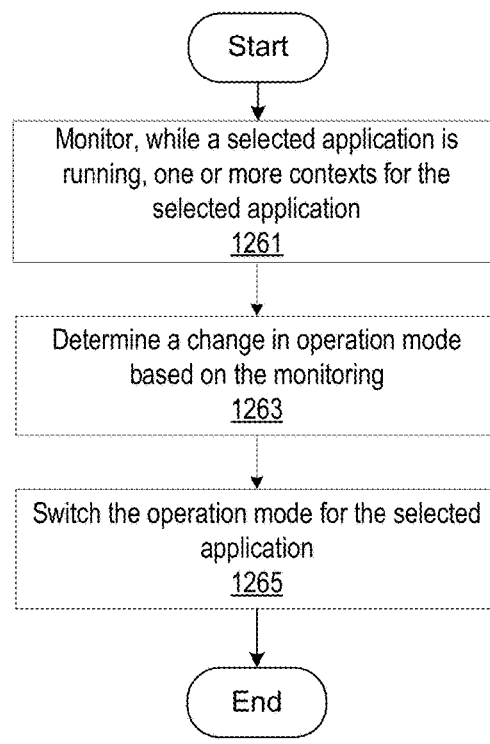
FIG. 12G illustrates an example method of switching an operation mode for an application.

In FIG. 12G, a flowchart of example method steps for switching an operation mode for an application is shown. For example, the method steps of FIG. 12G may follow the method steps of FIG. 12A. The method of FIG. 12G may begin at step 1261, where one or more contexts may be monitored while a selected application is running. In an embodiment, one or more of the contexts described with reference to FIGS. 12B-12F may be monitored. For example, a mobile device running a selected application may be connected to a cellular network and while the selected application is running, the mobile device may make a new network connection with a WLAN internal to a company.

The method of FIG. 12G may proceed from step 1261 to step 1263, where a change in an operation mode for a selected application is detected based on the monitoring. Stated differently, the mobile device may detect a change in information that formed the basis for selecting a particular operational mode. For example, a selected application may be running in unmanaged mode, and once a mobile application running the selected application connects to a WLAN internal to a company, a policy may define that the operation mode for the selected application should switch to managed mode. Any of the above contexts described in connection with FIGS. 12B-12E may be used in detecting whether a change in information has occurred. The method of FIG. 12G may proceed from step 1263 to step 1265, where the operation mode for the selected application is switched. In some variations, switching an operation mode may include moving the application from the managed partition to an unmanaged partition, or vice versa. Switching an operation mode may also include performing a selective wipe (as described in connection with FIG. 11), such as when an application switches from a managed mode to an unmanaged mode.

Figure 13A:
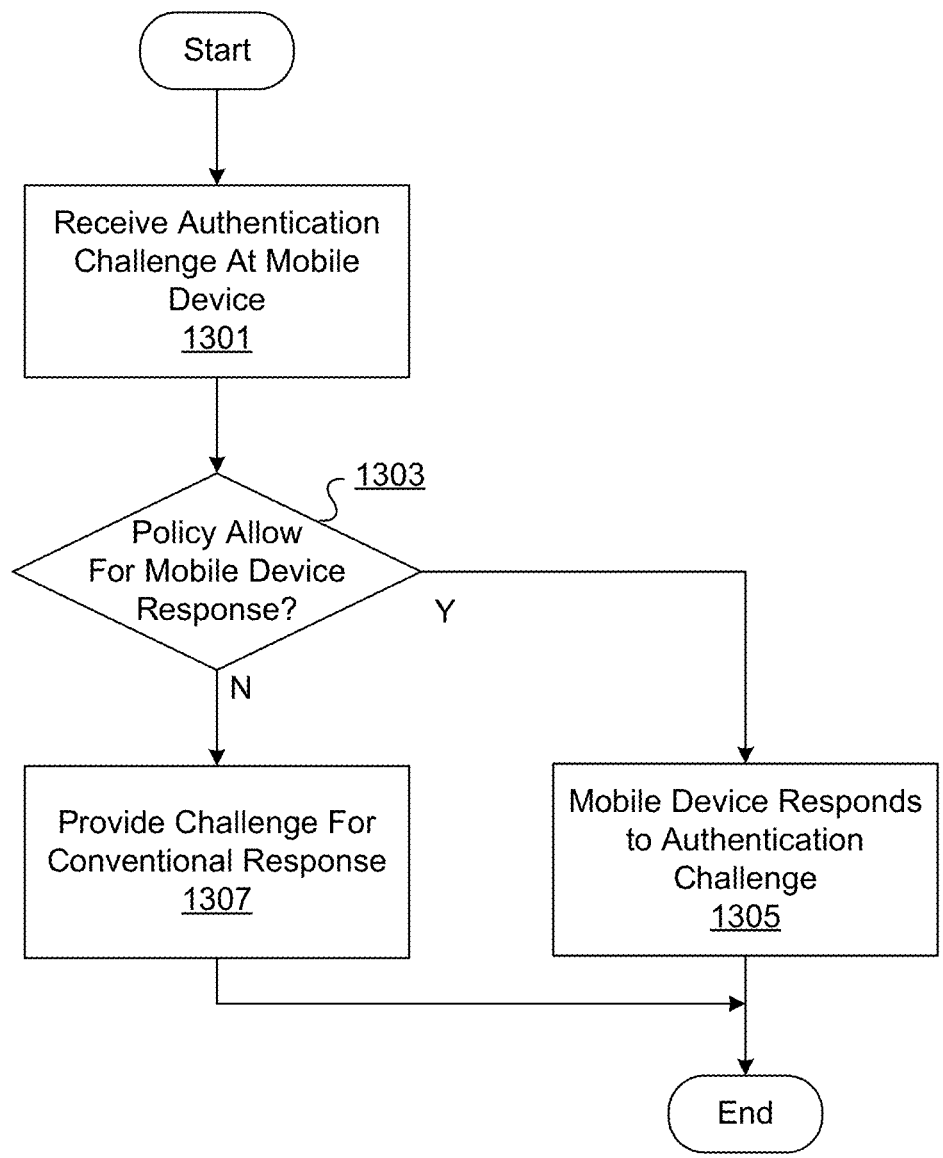

As discussed above, a user may proceed through an authentication process (e.g., user authentication) to access enterprise resources. In some embodiments, this may be performed via a SSO process (e.g., SSO Mutual SSL, limited or full Kerberos using passwords or client certificates). In various embodiments, the per-application policy controlled microVPN tunnel, the tickets received/stored by a mobile to authenticate a user when establishing such a tunnel (see, e.g., FIG. 9), the access gateway, and other aspects may form a basis for providing authentication-related processes that can improve the user's experience, such as by providing a more seamless user experience. FIGS. 13A-13C illustrate example methods for providing authentication-related functionality in accordance with various aspects described herein.

FIG. 13A illustrates a method for responding to authentication challenges at a mobile device. In one or more embodiments, the example method of FIG. 13A may be performed by the processing circuitry of a mobile device when operating in accordance with various software constructs stored in the memory of the mobile device.

At step 1301, a mobile device may receive an authentication challenge in connection with an authentication process for a managed application. For example, a mobile device, when performing an authentication process may receive and/or exchange HTTP status codes with an enterprise that causes receipt of an authentication challenge, such as HTTP 401 codes for requesting authentication, and/or challenge-response messages. Based on the type of authentication, an enterprise resource may send an authentication challenge. For Kerberos authentication, a PKINIT protocol may be used. The enterprise resource may generate a Kerberos authentication challenge, such as HTTP 401 Negotiate. For SSL authentication (e.g., using a client certificate), an enterprise resource may generate a client certificate challenge. In some variations, the mobile device identifies receipt of an authentication challenge by monitoring network traffic, including network traffic flowing within a per-application policy-controlled VPN tunnel, such as a MicroVPN. Additionally, receiving the authentication challenge may include intercepting the authentication challenge before it is received by an application.

Upon receiving the authentication challenge, the mobile device may proceed from step 1301 to step 1303, where the mobile device may determine whether a policy allows for the mobile device to respond to the authentication challenge instead of a user or managed application. For example, a policy may define that a mobile device can send responses to authentication challenges based on a listing of allowed sources (e.g., the mobile device may respond if the authentication challenge is received from a sharepoint or an exchange server, or the like). A policy may define that a mobile device can send responses to authentication challenges based on the mobile device having a token that is valid for the application. In some variations, the mobile device may determine whether the mobile device has a token that is valid and/or not expired for the application similar to step 905 of FIG. 9.

If it is determined that the mobile device is allowed to respond to the authentication challenge, the method may proceed to step 1305. Otherwise (e.g., the ticket for the managed application is expired), the method may proceed to step 1307 where the authentication challenge is provided for further processing in accordance with conventional methods of responding to authentication challenges (e.g., provided to the application, provided to the user a notification that directs the user to select credentials to send as a response to the authentication challenge, etc.).

At step 1305, the mobile device may respond to the authentication challenge. Responding to the authentication challenge may include analyzing the challenge to identify what is being requested; locating any credential, certificate, etc., requested by the challenge; generating the response and transmitting the response to the source of the authentication challenge. In some variations, responding the authentication challenge may include transmitting the response using a per-application policy-controlled VPN tunnel, such as the tunnel being used by the managed application that the authentication challenge was originally directed to.

In some variations, steps 1301-1305 may proceed without the application and/or the user being aware of the authentication challenge. For example, the mobile device may intercept the authentication response prior to being received by the application, or the user may not be presented with a message regarding the authentication challenge.

In addition to being performed by the mobile device, the access gateway may perform a similar method. For example, the access gateway may intercept an authentication challenge similar to step 1301. The access gateway may determine whether a policy allows for the access gateway to respond to the challenge on behalf of the mobile device similar to step 1303. The access gateway may also respond to the challenge similar to step 1305.

Furthermore, a method similar to that illustrated in FIG. 13A may be performed using a combination of the mobile device and access gateway. For example, the access gateway may intercept an authentication challenge similar to step 1301. The access gateway may communicate with the mobile device to determine whether the access gateway or the mobile device should respond to the challenge. The mobile device may perform a determination similar to step 1303 to determine whether the access gateway or the mobile device is authorized by a policy to respond to the challenge. If the access gateway or the mobile device is allowed to respond, the appropriate device may proceed with the response similar to step 1305.

FIG. 13B illustrates a method for providing tokens, certificates, or other credentials from an access gateway to one or more mobile devices. The example method of FIG. 13B may be performed by the processing circuitry of an access gateway (authentication server) when operating in accordance with various software constructs stored in the memory of the access gateway.

At step 1321, the access gateway (or authentication server) may receive a message in connection with an initial authentication of an application or a mobile device. For example, the message may be in connection with an initial authentication process that authenticates a user prior to allowing a managed application, which is executing on a mobile device, access to enterprise resources In some arrangements, the enterprise may send the message (e.g., a command to send authentication credentials and the like to registered mobile devices of a user). In others, the mobile device may transmit the message as part of its initial authentication process (e.g., similar to step 901 of FIG. 9).

At step 1323, the access gateway may determine credential information associated with the requesting user, application, mobile device, or account of the user. For example, the access gateway may maintain a listing of tokens that have been issued (or can be issued) to a mobile device or have been issued to any mobile device associated with the user (e.g., registered devices). The access gateway may also maintain a listing of policies (e.g., policy information) that are linked to the user. The access gateway may also maintain a listing of certificates that are linked to the user. In some arrangements, an enterprise operator may input or modify the listings (e.g., an IT technician may setup the listings manually). In others, the access gateway may create and modify the listings based on traffic being sent to mobile devices registered to the user (e.g., add a ticket or certificate to a listing when such is sent to a mobile device registered to the user).

At step 1325, the access gateway may transmit the credential information to one or more mobile devices. For example, the access gateway may transmit the credential information to a single mobile device (e.g., in response to a request for particular types of credential information; or in response to receiving a direction to send credential information to a particular mobile device, etc.). The access gateway may also transmit the credential information to a plurality of mobile devices (e.g., in response to a request from a particular mobile, the access gateway may transmit the credential information to all devices registered with the enterprise for the user; or in response to receiving a direction to send to multiple devices, the access gateway may transmit the credential information to the multiple devices, etc.).

In some variations, the credential information may include information that is both responsive to the message received at step 1321 and additional information that is not specifically responsive to the message. For example, a mobile device may transmit a message requesting initial authorization of the mobile device and may provide credentials to perform the initial authorization. Responsive to the message, the access gateway may perform the initial authorization and, assuming the supplied credentials are validated, the access gateway may transmit credential information that identifies the initial authorization as successful (e.g., information responsive to the message) and may transmit tickets, certificates, policies, and/or the like to the mobile device (e.g., additional information that is not specifically responsive to the message).

In some variations, transmitting the credential information may include transmitting using a per-application policy-controlled VPN tunnel, such as the MicroVPN tunnels illustrated in FIG. 5 and further described throughout the disclosure, such as in connection with FIG. 9.

FIG. 13C illustrates an example method for providing certificates from a mobile device. In one or more embodiments, the example method of FIG. 13C may be performed by the processing circuitry of a mobile device when operating in accordance with various software constructs stored in the memory of the mobile device. While the example depicted in FIG. 13C will be discussed in connection with transmitting certificates used by a managed browser, similar techniques could be used to provide certificates from a mobile device for different types of application.

For example, an enterprise resource or a website being accessed via a managed application, such as a managed browser, may demand a certificate from the user or mobile device. Accordingly, at step 1341, the mobile device may receive a message representing a demand or challenge for the certificate. In addition to a managed browser, other application types may demand a certificate. For example, a managed application may be running in a managed browser. The managed application may also be an application that communicates using an HTTP or HTTPS protocol (similar to how a managed browser uses HTTP or HTTPS protocols), or other web-based protocol. The remaining portion of FIG. 13C will be discussed in terms of a managed browser, but certificate demands in connection with a managed application running within a browser or a managed application that uses HTTP, HTTPS or other web-based protocol could be responded to in a similar fashion.

Conventionally, a user may be asked by the browser to provide a certificate. However, at step 1343, the mobile device may analyze a policy associated with the managed browser to determine whether the policy allows for the mobile device to provide the certificate instead of a user or the managed browser (e.g., without receiving input or otherwise notifying the user of the message or demand for certificate). For example, a policy may define that a mobile device can send certificates based on a listing of certificates or types of certificates that may be sent (e.g., the mobile device may respond if the requested certificate is found on the list). A policy may define that a mobile device can send certificates based on the mobile device having a token that is valid for the browser application. In some variations, the mobile device may determine whether the mobile device has a token that is valid for the browser similar to step 905 of FIG. 9.

In one or more embodiments, the mobile device may recognize the message as a certificate request (e.g., a PK operation 'authentication' protocol). Accordingly, the mobile device may decode the message from the received header format and pass a binary structure of the message for additional processing, such as via a PKOperation SDK. The PKOperation SDK may have knowledge of the available client certificate(s). The certificates may be in the form of a physical smart card, a virtual smart card, and the like. The PKOperation SDK may decode the message (including processing any encryption/integrity wrappers), and dispatch it to an appropriate internal handler. The handler may process the message and generate a list of available certificates. The list of certificates may be filtered according to relevance for the operation being requested, for example, to only include certificates with an appropriate key usage indicator. The list of certificates may be filtered until only one certificate remains. Such filtering may be performed based on the policy for the browser application. The list may be in a binary structure that represents the operation result. The PKOperation SDK may return the list of certificates, which may still be in the binary structure or signal an error condition if the list cannot be generated.

If it is determined that the mobile device is allowed to send a certificate, the method may proceed to step 1345. Otherwise, method may proceed to step 1347 where the message is provided for further processing in accordance with conventional methods of sending certificates (e.g., asking the user to select a certificate to send as a response to the message).

At step 1345, the mobile device may transmit the certificate responsive to the request. Transmitting the certificate may include locating any certificate that is to be sent. In some variations, responding the authentication challenge may include transmitting the certificate using a per-application policy-controlled VPN tunnel, such as the tunnel being used by the browser application.

In some variations, steps 1341-1345 may proceed without the application and/or the user being aware of the certificate demand (e.g., the user may not be presented with a message regarding the authentication challenge).

Although the subject matter has been described in language specific to structural features and/or methodological acts, it is to be understood that the subject matter defined any claim is not necessarily limited to the specific features or acts described above. Rather, the specific features and acts described above are described as some example implementations of the following claims.

We claim:

1. A method comprising:
   storing, by a mobile device, a ticket in a secure container, wherein the secure container is usable to store data related to a managed application of the mobile device, wherein the ticket is configured to provide authentication in connection with creating a virtual private network (VPN) tunnel for the managed application to at least one resource accessible through an access gateway, and wherein the ticket is configured to expire after a validity duration;
   based on the ticket, the VPN tunnel, and policy information, providing the managed application with access to the at least one resource, wherein the policy information describes one or more policies for providing the managed application with access to the at least one resource;
   determining to perform a selective wipe;
   determining that the ticket is stored by the mobile device; and
   deleting the ticket from the secure container.

2. The method of claim 1, further comprising:
   storing, at the mobile device, the policy information in the secure container; and
   deleting the policy information as part of a selective wipe process that deletes secured data associated with the managed application.

3. The method of claim 2, further comprising:
   searching, based on the policy information, the secure container for the ticket.

4. The method of claim 1, further comprising:
   transmitting, to the access gateway, a selective wipe acknowledgement, wherein the selective wipe acknowledgement includes a listing of tickets that were deleted during the selective wipe.

5. The method of claim 1, wherein determining that the ticket is stored by the mobile device includes analyzing the policy information for an identification of the ticket or a location where the ticket is stored.

6. The method of claim 1, wherein the VPN tunnel is a per-application policy-controlled VPN tunnel that provides only the application with access to the at least one resource.

7. The method of claim 1, wherein determining to perform the selective wipe is based on the managed application being switched from a managed mode of operation to an unmanaged mode of operation.

8. The method of claim 1, wherein determining to perform the selective wipe is based on one or more of the following: a determination that the mobile device is jailbroken or rooted, a determination that the mobile device is installed with a blacklisted application, or a determination that the mobile device is not configured with a lock screen.

9. The method of claim 1, wherein determining to perform the selective wipe is based on the managed application being uninstalled.

10. An apparatus comprising:
    at least one processor; and
    memory storing executable instructions configured to, when executed by the at least one processor, cause the apparatus to:
        store a ticket in a secure container, wherein the secure container is usable to store data related to a managed application of the apparatus, wherein the ticket is configured to provide authentication in connection with creating a virtual private network (VPN) tunnel for the managed application to at least one resource accessible through an access gateway, and wherein the ticket is configured to expire after a validity duration,
        based on the ticket, the VPN tunnel, and policy information, provide the managed application with access to the at least one resource, wherein the policy information describes one or more policies for providing the managed application with access to the at least one resource,
        determine to perform a selective wipe,
        determine that the ticket is stored by the apparatus, and
        delete the ticket from the secure container.

11. The apparatus of claim 10, wherein the executable instructions are configured to, when executed by the at least one processor, cause the apparatus to:
    store the policy information in the secure container; and
    delete the policy information as part of a selective wipe process that deletes secured data associated with the managed application.

12. The apparatus of claim 10, wherein the executable instructions are configured to, when executed by the at least one processor, cause the apparatus to search, based on the policy information, the secure container for the ticket.

13. The apparatus of claim 10, wherein the executable instructions are configured to, when executed by the at least one processor, cause the apparatus to transmit to the access gateway, a selective wipe acknowledgement, wherein the selective wipe acknowledgement includes a listing of tickets that were deleted during the selective wipe.

14. The apparatus of claim 10, wherein causing the apparatus to determine that the ticket is stored by the apparatus includes causing the apparatus to analyze the policy information for an identification of the ticket or a location where the ticket is stored.

15. The apparatus of claim 10, wherein the VPN tunnel is a per-application policy-controlled VPN tunnel that provides only the application with access to the at least one resource.

16. The apparatus of claim 10, wherein causing the apparatus to determine to perform the selective wipe is based on one or more of the following: the managed application being switched from a managed mode of operation to an unmanaged mode of operation, the managed application being uninstalled, a determination that the apparatus is jailbroken or rooted, a determination that the apparatus is installed with a blacklisted application, or a determination that the apparatus is not configured with a lock screen.

17. One or more non-transitory computer-readable media storing executable instructions configured to, when executed, cause a computing device to:
   store a ticket in a secure container, wherein the secure container is usable to store data related to a managed application of the computing device, wherein the ticket is configured to provide authentication in connection with creating a virtual private network (VPN) tunnel for the managed application to at least one resource accessible through an access gateway, and wherein the ticket is configured to expire after a validity duration;
   based on the ticket, the VPN tunnel, and policy information, provide the managed application with access to the at least one resource, wherein the policy information describes one or more policies for providing the managed application with access to the at least one resource;
   determine to perform a selective wipe;
   determine that the ticket is stored by the computing device; and
   delete the ticket from the secure container.

18. The one or more non-transitory computer-readable media of claim 17, wherein the executable instructions are configured to, when executed, cause the computing device to:
   store the policy information in the secure container;
   delete the policy information as part of a selective wipe process that deletes secured data associated with the managed application; and
   search, based on the policy information, the secure container for the ticket.

19. The one or more non-transitory computer-readable media of claim 17, wherein the executable instructions are configured to, when executed, cause the computing device to transmit, to the access gateway, a selective wipe acknowledgement, wherein the selective wipe acknowledgement includes a listing of tickets that were deleted during the selective wipe.

20. The one or more non-transitory computer-readable media of claim 17, wherein causing the computing device to determine that the ticket is stored by the computing device includes causing the computing device to analyze the policy information for an identification of the ticket or a location where the ticket is stored.

* * * * *